(12) United States Patent

Faeulhammer et al.

(10) Patent No.: US 12,573,077 B1

(45) Date of Patent: Mar. 10, 2026

(54) NON-USER HAND REJECTION FOR EXTENDED REALITY DEVICES

(71) Applicant: Snap Inc., Santa Monica, CA (US)

(72) Inventors: Thomas Faeulhammer, Vienna (AT); Balázs Tóth, Vienna (AT); Daniel Wolf, Mödling (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/828,718

(22) Filed: Sep. 9, 2024

(51) Int. Cl.
| | |
|---|---|
| *G06T 7/70* | (2017.01) |
| *G06F 3/01* | (2006.01) |
| *G06T 7/11* | (2017.01) |
| *G06T 7/20* | (2017.01) |
| *G06V 40/10* | (2022.01) |

(52) U.S. Cl.
CPC ................ *G06T 7/70* (2017.01); *G06F 3/011* (2013.01); *G06F 3/017* (2013.01); *G06T 7/11* (2017.01); *G06T 7/20* (2013.01); *G06V 40/107* (2022.01); *G06T 2207/30196* (2013.01)

(58) Field of Classification Search
CPC ..... G06T 7/70; G06T 7/11; G06T 7/20; G06T 2207/30196; G06F 3/011; G06F 3/017; G06V 40/107
See application file for complete search history.

(56) References Cited

U.S. PATENT DOCUMENTS

| | | | |
|---|---|---|---|
| 11,030,454 | B1 | 6/2021 | Xiong et al. |
| 11,531,402 | B1 | 12/2022 | Stolzenberg |

| | | | |
|---|---|---|---|
| 11,861,801 | B2 | 1/2024 | Gurgul et al. |
| 11,989,843 | B2 | 5/2024 | Zhou et al. |
| 2017/0185830 | A1* | 6/2017 | Srivastava ........... G02B 27/017 |
| 2019/0146219 | A1 | 5/2019 | Rodriguez, II |
| 2021/0294423 | A1 | 9/2021 | Zhou et al. |
| 2022/0004750 | A1 | 1/2022 | Koo et al. |
| 2022/0206588 | A1 | 6/2022 | Canberk et al. |
| 2022/0326781 | A1 | 10/2022 | Hwang et al. |

(Continued)

FOREIGN PATENT DOCUMENTS

| | | |
|---|---|---|
| WO | 2022005687 | 1/2022 |
| WO | 2022060549 | 3/2022 |

(Continued)

OTHER PUBLICATIONS

US 12,013,985 B1, 06/2024, Stolzenberg et al. (withdrawn)

(Continued)

*Primary Examiner* — Adam R. Giesy

(74) *Attorney, Agent, or Firm* — Schwegman Lundberg & Woessner, P.A.

(57) ABSTRACT

Examples in the present disclosure relate to systems and methods for detecting and rejecting a non-user hand in the context of egocentric hand tracking performed by an extended reality (XR) device. While the XR device is worn by a user, the XR device captures at least one image of a hand and processes the at least one image to detect the hand. After detecting the hand, the XR device determines positioning of the hand relative to the XR device or another object in a field of view of the XR device. The XR device detects that the hand is a non-user hand. In response to detecting that the hand is a non-user hand, the XR device excludes the non-user hand from the egocentric hand tracking such that the non-user hand is not tracked for the user.

20 Claims, 15 Drawing Sheets

(56)     References Cited

U.S. PATENT DOCUMENTS

| 2023/0306097 A1 | 9/2023 | Finney et al. |
| 2023/0350427 A1 | 11/2023 | Hintermann et al. |
| 2023/0418062 A1 | 12/2023 | Wawruch |
| 2023/0418385 A1 | 12/2023 | Feinman et al. |
| 2024/0013493 A1 | 1/2024 | Arya et al. |
| 2024/0087609 A1 | 3/2024 | Goodrich et al. |
| 2024/0127006 A1 | 4/2024 | Zhou et al. |
| 2024/0187814 A1 | 6/2024 | Arya et al. |
| 2024/0203072 A1 | 6/2024 | Solichin |
| 2024/0402862 A1* | 12/2024 | Shutzberg ........... G06F 3/04842 |

FOREIGN PATENT DOCUMENTS

| WO | 2022066578 | 3/2022 |
| WO | 2022132381 | 6/2022 |
| WO | 2022225761 | 10/2022 |
| WO | 2022245765 | 11/2022 |
| WO | 2023192386 | 10/2023 |
| WO | 2023220163 | 11/2023 |
| WO | 2023244490 | 12/2023 |
| WO | 2024049578 | 3/2024 |
| WO | 2024049579 | 3/2024 |
| WO | 2024063865 | 3/2024 |

OTHER PUBLICATIONS

"International Application Serial No. PCT/US2025/043752, International Search Report mailed Nov. 11, 2025", 3 pgs.
"International Application Serial No. PCT/US2025/043752, Written Opinion mailed Nov. 11, 2025", 6 pgs.

* cited by examiner

100

REAL-WORLD ENVIRONMENT

FIELD OF VIEW

NON-USER HAND REJECTION FOR EXTENDED REALITY DEVICES

TECHNICAL FIELD

Subject matter in the present disclosure relates, generally, to extended reality (XR) devices. More specifically, but not exclusively, the subject matter relates to hand detection and hand tracking operations that are performed to facilitate XR experiences.

BACKGROUND

Many XR devices include tracking systems. For example, a tracking system of an XR device processes images captured by one or more cameras of the XR device to determine positions of landmarks (e.g., joints or fingers of a hand) or other visual features in a scene. This enables the XR device to track an object, such as a hand of a user, within a field of view of the XR device.

Some XR devices use hand gestures as an input. This enables a user to interact with an XR device without a traditional input device, such as a touchpad or controller, but typically requires swift and accurate detection and tracking of the hand.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
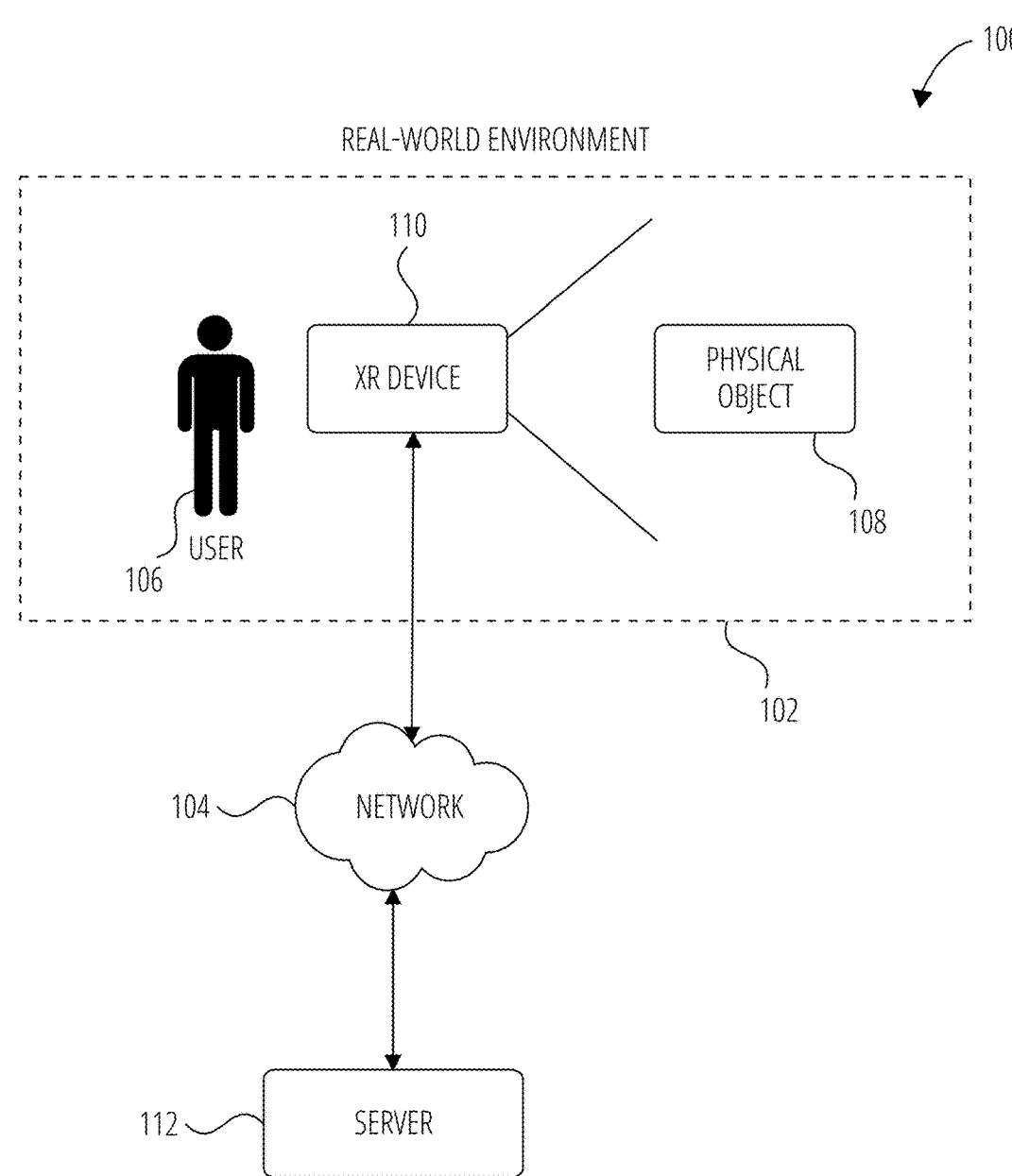
FIG. 1 is a block diagram illustrating a network environment for operating an XR device, according to some examples.

The description that follows describes systems, devices, methods, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some of these specific details or with other details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

XR devices can include augmented reality (AR) devices or virtual reality (VR) devices. "Augmented reality" (AR) can include an interactive experience of a real-world environment, where physical objects or environments that reside in the real world are "augmented" or enhanced by computer-generated digital content (also referred to as virtual content or synthetic content). AR can also refer to a system that enables a combination of real and virtual worlds (e.g., mixed reality), real-time interaction, or three-dimensional (3D) registration of virtual and real objects. In some examples, a user of an AR system can perceive or interact with virtual content that appears to be overlaid on or attached to a real-world physical object. The term "AR application" is used herein to refer to a computer-operated application that enables an AR experience.

"Virtual reality" (VR) can include a simulation experience of a virtual world environment that is distinct from the real-world environment. Computer-generated digital content is displayed in the virtual world environment. VR can refer to a system that enables a user of a VR system to be completely immersed in the virtual world environment and to interact with virtual objects presented in the virtual world environment. While examples described in the present disclosure focus primarily on XR devices that provide an AR experience, it will be appreciated that one or more aspects of the present disclosure may also be applied to VR.

In many XR devices, and particularly in many head-worn AR devices, the hands of the user of the XR device serve as the primary interaction tool. For example, the XR device generates and presents a gesture-driven user interface to the user, and the user performs predetermined hand gestures, such as swiping, tapping, pinching, and dragging, to interact with virtual content (e.g., objects and data items) via the gesture-driven user interface. Accordingly, the XR device should swiftly and accurately detect and track a hand of the user.

To this end, an XR device can be configured so as to perform egocentric hand tracking. In this context, "egocentric hand tracking" refers to hand tracking that is performed from a first-person perspective, with the "first person" being the user of the XR device. For example, the user wears the XR device on (or it is otherwise mounted on) their head, shoulder, or chest, capturing a scene substantially as the user would see it. The XR device thus tracks the position, orientation, or movement of the hand of the user substantially from the viewpoint of the user.

Egocentric hand tracking is intended to focus on the hands of the user (referred to as "user hands" in the present disclosure), as opposed to tracking other hands that may appear in the field of view of the XR device. Such other hands that do not belong to the user of the XR device are referred to in the present disclosure as "non-user hands."

If the XR device does detect and starts tracking a non-user hand in the wrong context, it can result in technical challenges. Firstly, the tracking of non-user hands in addition to user hands increases the computational burden on the XR device, resulting, for example, in poor battery life or latency issues. Non-user hands are often irrelevant, which means that tracking data obtained from tracking non-user hands will also be irrelevant.

Furthermore, a non-user hand can interfere with the user's XR experience. Movements of a non-user hand can incorrectly be detected as user gestures, resulting in the non-user hand causing manipulation of virtual objects, navigation of menus, or inputting of commands within the user's XR environment. Moreover, allowing a non-user hand to provide inputs and cause interactions within a user's XR experience can raise data security and privacy concerns.

Examples described herein enable an XR device to efficiently detect and reject non-user hands (e.g., exclude the non-user hands from egocentric hand tracking). By identifying non-user hands correctly, the performance of the XR device can be improved, such as through a reduction in latency or improvements in battery life. Furthermore, the XR experience may be more reliable, user-friendly, or immersive.

The present disclosure describes robust technical solutions for detecting whether a hand is a non-user hand. Through such solutions, the XR device can selectively track only the user hand or user hands in the field of view, and dynamically exclude non-user hands from egocentric hand tracking. In some examples, the XR device is enabled to detect and reject a non-user hand as early as possible in a tracking pipeline, thereby avoiding a situation in which excessive resources are wasted to track the non-user hand for a significant period of time.

Examples described herein provide various rejection filters that can be implemented in dynamic or configurable rejection filter sequences. This enables adjustment of rejection filters to suit device capabilities or use cases.

In some examples, a method is performed by an XR device, such as a head-wearable XR device (in which case the method is performed while the XR device is worn on a head of a user). The method includes capturing, via one or more optical sensors, at least one image of a hand. The at least one image is processed to detect the hand. The method may include, after detecting the hand, determining positioning of the hand relative to at least one of the XR device or another object in a field of view of the XR device.

The method may include detecting, based on the positioning of the hand relative to at least one of the XR device or the other object, that the hand is a non-user hand. In some examples, the detection of the non-user hand may involve execution of one or multiple rejection filters (e.g., according to a predetermined sequence). In response to detecting that the hand is a non-user hand, the XR device automatically excludes the hand from egocentric hand tracking performed by the XR device with respect to the user.

In some examples, the hand is detected to be a non-user hand based on both the positioning of the hand relative to the XR device and the positioning of the hand relative to the other object in the field of view of the XR device. The other object in the field of view may include a user hand, such as a user hand that is already being tracked by the XR device.

One or multiple rejection filters may be used by the XR device. The rejection filters can include, for example, one or more distance-based filters, one or more relative hand position filters, one or more entry region-based filters, one or more relative hand and arm position filters, or combinations thereof. By applying one or a combination of these rejection filters, the XR device can identify and exclude non-user hands from egocentric hand tracking, thereby addressing or alleviating the technical challenges described herein.

The method may include presenting, via the XR device, a gesture-driven user interface comprising virtual content. In some examples, the egocentric hand tracking is performed by the XR device to obtain, from the user, user input for navigation of the gesture-driven user interface. Examples described herein reduce the risk of a non-user hand interfering with or influencing navigation of the gesture-driven user interface.

In some examples, the XR device executes an object tracking system. A tracking pipeline of the object tracking system, as performed for a particular object (e.g., a hand), can include two distinct phases: a detection phase and a tracking phase. In some examples, for a given hand detected by the XR device during the detection phase, the egocentric hand tracking is performed in the tracking phase that follows completion of the detection phase.

The detection phase may involve identifying the presence of an object. For example, the object tracking system detects the presence of a hand by processing one or more frames of a video stream. The detection phase may also involve identifying a location of the object, such as by generating a bounding element (e.g., a bounding box) surrounding the object. Object detection algorithms or machine learning models, such as deep learning-based models, can be used for this purpose.

The detection phase may be different from the tracking phase in that the object tracking system typically does not have "prior knowledge," or has limited "prior knowledge," about the object or its location during the detection phase. For example, in the tracking phase, the object tracking system tracks the position and/or orientation of the object over time (e.g., across multiple frames). Furthermore, in the detection phase, while the object tracking system may detect a location of the object, it typically has limited further information about the object. For example, in the case of a hand, the object tracking system generates a bounding box for the hand, but has not yet generated landmark information related to the specific positions of key points on the hand. Such further information is typically generated during the tracking phase, which can significantly increase the overall computational requirements associated with the tracking pipeline.

In some examples, one or more rejection filters enable exclusion of the hand from the egocentric hand tracking after completion of the detection phase for the hand, but prior to commencement of the tracking phase for the hand (or relatively shortly after commencement of the tracking phase). This can significantly reduce the computational burden on the XR device, for example, since no significant further processing is needed for the specific hand after its bounding box is generated.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., 3D models of virtual objects, or digital effects to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

The XR device 110 may have different display arrangements. In some examples, the display arrangement may include a screen that displays what is captured with a camera of the XR device 110. In some examples, the display of the device may be transparent or semi-transparent. In some examples, the display may be non-transparent and wearable by the user to cover the field of vision of the user.

The user 106 operates an application of the XR device 110, referred to herein as an AR application. The AR application may be configured to provide the user 106 with an experience triggered or enhanced by a physical object 108, such as a two-dimensional (2D) physical object (e.g., a picture), a 3D physical object (e.g., a statue), a location (e.g., at factory), or any references (e.g., perceived corners of walls or furniture, QR codes) in the real-world physical environment. For example, the user 106 may point a camera of the XR device 110 to capture an image of the physical object 108 and a virtual overlay may be presented over the physical object 108 via the display. In some cases, AR content is referred to as digital effects which are generated by a digital effects application.

In some examples, the physical object 108 is a hand, such as the hand of the user 106. Experiences may thus also be triggered or enhanced by a hand or other body part of the user 106. For example, the XR device 110 detects and responds to hand gestures. The XR device 110 may also present information content or control items, such as user interface elements, to the user 106 during a user session.

The XR device 110 includes one or more tracking systems or tracking components (not shown in FIG. 1). The tracking components track the pose (e.g., position and orientation) of the XR device 110 relative to a real-world environment 102 using image sensors (e.g., depth-enabled 3D camera, or image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102.

The tracking components can also track the pose of real-world objects, such as the physical object 108 or the hand of the user 106. In some examples, the XR device 110 is worn on the head of the user 106, and the XR device 110 performs egocentric hand tracking to track the hand of the user 106 in the real-world environment 102 substantially from the perspective of the user 106.

In some examples, the server 112 is used to detect and identify the physical object 108 based on sensor data (e.g., image and depth data) from the XR device 110, and determine a pose of the XR device 110 or the physical object 108 based on the sensor data. The server 112 can also generate a virtual object or other virtual content based, for example, on the pose of the XR device 110 and the physical object 108.

In some examples, the server 112 communicates virtual content to the XR device 110. In other examples, the XR device 110 obtains virtual content through local retrieval or generation. The XR device 110 or the server 112, or both, can perform image processing, object detection, and object tracking functions based on images captured by the XR device 110 and one or more parameters internal or external to the XR device 110.

The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
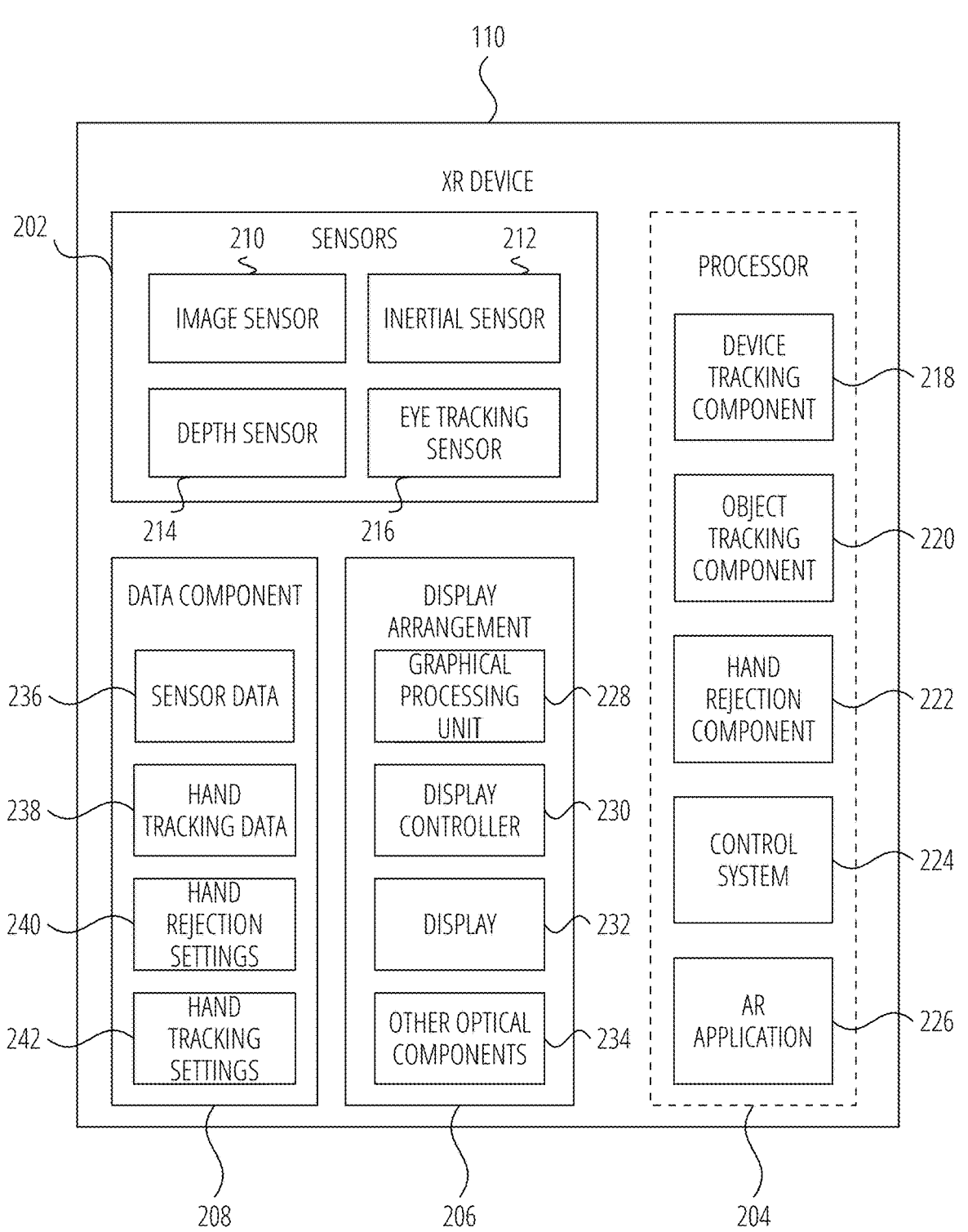
FIG. 2 is a block diagram illustrating components of an XR device, according to some examples.

FIG. 2 is a block diagram illustrating components (e.g., modules, parts, systems, or subsystems) of the XR device 110, according to some examples. The XR device 110 is shown to include sensors 202, a processor 204, a display arrangement 206, and a data component 208. It will be appreciated that FIG. 2 is not intended to provide an exhaustive indication of components of the XR device 110.

The sensors 202 include one or more image sensors 210, one or more inertial sensors 212, one or more depth sensors 214, and one or more eye tracking sensors 216. The image sensor 210 includes one or more of a color camera, a thermal camera, or a grayscale, global shutter tracking camera. The image sensors 210 may include more than one of the same cameras (e.g., multiple color cameras).

The inertial sensor 212 includes, for example, a combination of a gyroscope, accelerometer, and a magnetometer. In some examples, the inertial sensor 212 includes one or more Inertial Measurement Units (IMUs). An IMU enables tracking of movement of a body by integrating the acceleration and the angular velocity measured by the IMU. An IMU may include a combination of accelerometers and gyroscopes that can determine and quantify linear acceleration and angular velocity, respectively. The values obtained from the gyroscopes of the IMU can be processed to obtain the pitch, roll, and heading of the IMU and, therefore, of the body with which the IMU is associated. Signals from the accelerometers of the IMU also can be processed to obtain velocity and displacement. In some examples, the magnetic field is measured by the magnetometer to provide a reference for orientation, helping to correct any drift in the gyroscope and/or accelerometer measurements, thereby improving the overall accuracy and stability of the estimations.

The depth sensor 214 may include one or more of a structured-light sensor, a time-of-flight sensor, a passive stereo sensor, and an ultrasound device. The eye tracking sensor 216 is configured to monitor the gaze direction of the user, providing data for various applications, such as adjusting the focus of displayed content or determining a zone of interest in the field of view. The XR device 110 may include one or multiple eye tracking sensors 216, such as infrared eye tracking sensors, corneal reflection tracking sensors, or video-based eye-tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and the sensors 202 are thus not limited to the ones described above.

The processor 204 implements or causes execution of a device tracking component 218, an object tracking component 220, a hand rejection component 222, a control system 224, and an AR application 226.

The device tracking component 218 estimates a pose of the XR device 110. For example, the device tracking component 218 uses data from the image sensor 210 and the inertial sensor 212 to track the pose of the XR device 110 relative to a frame of reference (e.g., real-world environment 102). In some examples, the device tracking component 218 uses tracking data to determine the pose of the XR device 110. The 3D pose includes a determined position of the XR device 110 in relation to the user's real-world environment 102. The pose may further include the orientation of the XR device 110 in relation to the real-world environment 102 (e.g., providing the pose in six degrees of freedom (6DOF)). The device tracking component 218 continually gathers and uses updated sensor data describing movements of the XR device 110 to determine updated poses of the XR device 110 that indicate changes in the relative position and/or orientation of the XR device 110 from the physical objects in the real-world environment 102.

A "SLAM" (Simultaneous Localization and Mapping) system or other similar system may be used to understand and map a physical environment in real-time. This allows, for example, an XR device to accurately place digital objects in the real world and track their position as a user moves and/or as objects move. The XR device 110 may include a "VIO" (Visual-Inertial Odometry) system that combines data from an IMU and a camera to estimate the position and orientation of an object in real-time. In some examples, a VIO system may form part of a SLAM system.

The object tracking component 220 enables the tracking of an object, such as the physical object 108 of FIG. 1. As mentioned, the XR device 110 can track a hand, and the object tracking component 220 can thus perform hand tracking, including egocentric hand tracking.

The object tracking component 220 may include a computer-operated application or system that enables a device or system to track visual features identified in images captured by one or more image sensors, such as one or more cameras. In some examples, the object tracking system builds a model of a real-world environment based on the tracked visual features. An object tracking system may implement one or more object tracking machine learning models to detect and/or track an object in the field of view of a user during a user session.

An object tracking machine learning model may comprise a neural network trained on suitable training data to identify and track objects in a sequence of frames captured by the XR device 110. An object tracking machine learning model typically uses an object's appearance, motion, landmarks, and/or other features to estimate location in subsequent frames.

In some examples, the object tracking component 220 implements a landmark detection system (e.g., using a landmark detection machine learning model). For example, based on images captured using the image sensors 210, the object tracking component 220 identifies 3D landmarks associated with joints of a hand of the user 106. In other words, the object tracking component 220 can detect and track the 3D positions of various joints (or other landmarks, such as bones or other segments of the hand) on the hand as the hand moves in the field of view of the XR device 110. In some examples, positions and orientations (e.g., relative angles) of the landmarks are tracked.

It is noted that 3D positions of landmarks can also be obtained in other ways. For example, in addition to images captured using cameras, the XR device 110 can use the depth sensor 214 to identify 3D landmarks. As another example, one or more tracking units (e.g., IMUs) worn on or held by a hand of a user can communicate with the XR device 110 to provide 3D positions or improve the accuracy of 3D position estimations.

In some examples, the object tracking component 220 is calibrated for a specific set of features. For example, when the object tracking component 220 performs hand tracking, a calibration component calibrates the object tracking component 220 by using a hand calibration, such as a hand size calibration for a particular user of the XR device 110. The calibration component can perform one or more calibration steps to measure or estimate hand features, such as the size of a hand and/or details of hand landmarks (e.g., fingers and joints). This may include bone length calibrations.

In some examples, calibration is performed in a multi-camera mode. For example, a hand is captured from two different camera views to obtain stereo image data, and the stereo image data is processed to measure a particular bone length that is to be used as a scale estimate representative of the overall scale of the hand.

As mentioned, the object tracking component 220 may implement two phases of object tracking: a detection phase in which the object of interest (e.g., the hand of the user 106) is identified, and a tracking phase in which the pose of the object is tracked over a period of time. Various algorithms, including algorithms implemented by machine learning models as mentioned above, may be used to predict or estimate the movement or pose of the object and to update the pose of the object over time.

A detection phase may involve identifying the presence and location of the object, e.g., in one or more frames of a video stream. In some examples, a bounding box is generated around the detected object. The tracking phase may refer to the tracking of an object of interest after detection or identification of the object, e.g., tracking a location or pose of the object as it moves relative to the XR device 110 or within the real-world environment 102. A tracking phase may involve continuously estimating the pose of the object, e.g., using tracking algorithms, such as optical flow, correlation filters, or deep learning-based methods. These techniques may utilize object tracking data from previous frames and, in some cases, assumptions or predictions about the object (e.g., assuming a constant velocity of the object), to predict the location or pose of the object in a current or target frame. A bounding box generated for the object may be continuously updated during the tracking phase.

In some examples, the object tracking component 220 is configured to detect or estimate a chirality of a hand within the field of view of the XR device 110. For example, the object tracking component 220 can execute a machine learning model that is trained, using supervised learning, to predict or infer, based on one or more input images, whether the hand in the image or images is a left hand or a right hand. The chirality information generated by the object tracking component 220 can be used in at least some examples in the present disclosure, as described elsewhere herein.

The hand rejection component 222 is configured to process sensor data and/or tracking data to distinguish between user hands and non-user hands. In some examples, the hand rejection component 222 implements a series of rejection filters to identify and exclude non-user hands from a tracking process, such as an egocentric hand tracking process. In some examples, the hand rejection component 222 operates in or shortly after the detection phase to reject a non-user hand before the tracking phase commences for that hand. In some examples, the hand rejection component 222 also operates during the tracking phase.

The control system 224 is responsible for coordinating various operations of the XR device 110, including operations of the hand rejection component 222. For example, when a hand is detected by the object tracking component 220, the control system 224 instructs the hand rejection component 222 to initiate a rejection filter sequence so as to determine whether the hand should be rejected, or "filtered out," due to it being a non-user hand. In some examples, if the hand rejection component 222 completes its check or checks, and determines that the hand is a user hand, the control system 224 instructs the object tracking component 220 to track (or to continue to track) the hand as part of an egocentric hand tracking process.

In some examples, the control system 224 manages the power consumption or performance optimization of the XR device 110. For example, the control system 224 dynamically adjusts the rejection filter sequence to balance various computational demands, such as processing associated with rejection filters, hand tracking, and virtual content rendering, to maintain efficient operation of the XR device 110.

The AR application 226 may retrieve a virtual object (e.g., 3D object model) based on an identified physical object 108 or physical environment (or other real-world feature), or retrieve an augmentation or digital effect to apply to the physical object 108. A graphical processing unit 228 of the display arrangement 206 causes display of the virtual object, augmentation, digital effect, or the like. In some examples, the AR application 226 includes a local rendering engine that generates a visualization of a virtual object overlaid (e.g., superimposed upon, or otherwise displayed in tandem with) on an image of the physical object 108 (or other real-world feature) captured by the image sensor 210. A visualization of the virtual object may be manipulated by adjusting a position of the physical object or feature (e.g., its physical location, orientation, or both) relative to the image sensor 210. Similarly, the visualization of the virtual object may be manipulated by adjusting a pose of the XR device 110 relative to the physical object or feature.

In some examples, the AR application 226 creates and renders a gesture-driven user interface that is overlaid on the user's view of the real world. This virtual content presented to the user can include 3D objects, user interface elements, or informational overlays. The AR application 226 may work in conjunction with the object tracking component 220, the hand rejection component 222, or the control system 224 to facilitate gesture-based interactions with the virtual content.

For instance, the AR application 226 receives input from the object tracking component 220 to allow users to manipulate virtual objects, navigate menus, or input commands using hand gestures. The operation of the hand rejection component 222 can ensure that the object tracking component 220 does not track or detect gestures performed by non-user hands, or filters them out before they reach the AR application 226, thereby allowing the AR application 226 to align content with and respond to user hands, and not non-user hands.

Through the egocentric hand tracking performed by the object tracking component 220 and the gesture-driven user interface provided via the AR application 226, the XR device 110 might, for example, allow a user to open a virtual menu by holding their palm up, select an item by pointing at it, and manipulate a 3D object by grabbing and moving it with their hand. The hand rejection component 222 rejects or excludes motion or gestures of a non-user hand, thus preventing the non-user hand from interfering with the gesture-driven user interface.

Referring again to the graphical processing unit 228, the graphical processing unit 228 may include a render engine that is configured to render a frame of a 3D model of a virtual object based on the virtual content provided by the AR application 226 and the pose of the XR device 110 (and, in some cases, the position of a tracked object). In other words, the graphical processing unit 228 uses the pose of the XR device 110 to generate frames of virtual content to be presented on a display 232. For example, the graphical processing unit 228 communicates with the AR application 226 to apply the pose to render a frame of the virtual content such that the virtual content is presented at an orientation and position in the display 232 to properly augment the user's reality. As an example, the graphical processing unit 228 may use the pose data to render a frame of virtual content such that, when presented on the display 232, the virtual content is caused to be presented to a user so as to overlap with a physical object in the user's real-world environment 102.

In some examples, the AR application 226 can work with the graphical processing unit 228 to generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

The graphical processing unit 228 transfers the rendered frame to a display controller 230. The display controller 230 is positioned as an intermediary between the graphical processing unit 228 and the display 232, receives the image data (e.g., rendered frame) from the graphical processing unit 228, re-projects the frame (by performing a warping process) based on a latest pose of the XR device 110 (and, in some cases, object tracking pose forecasts or predictions), and provides the re-projected frame to the display 232.

In some examples, the display 232 is not directly in the gaze path of the user. For example, the display 232 can be offset from the gaze path of the user and other optical components 234 direct light from the display 232 into the gaze path. The other optical components 234 include, for example, one or more mirrors, one or more lenses, or one or more beam splitters.

It will be appreciated that, in examples where an XR device includes multiple displays, each display can have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement can deliver separate images or video streams to each eye. Where an XR device includes multiple displays, steps may be carried out separately and substantially in parallel for each display, in some examples, and pairs of features or components may be included to cater for both eyes.

For example, an XR device captures separate images for a left eye display and a right eye display (or for a set of right eye displays and a set of left eye displays), and renders separate outputs for each eye to create a more immersive experience and to adjust the focus and convergence of the overall view of a user for a more natural, 3D view. Thus, while a single set of display arrangement components is shown in FIG. 2, similar techniques may be applied to cover both eyes by providing a further set of display arrangement components.

Still referring to FIG. 2, the data component 208 stores various data, such as sensor data 236, hand tracking data 238, hand rejection settings 240, and/or hand tracking settings 242. The sensor data 236 may include data obtained from one or more of the sensors 202, such as image data from the image sensor 210, eye tracking data from the eye tracking sensor 216, depth maps generated by the XR device 110, or the like. The sensor data 236 can also include data related to the position, velocity, and/or acceleration of a user's hand movements.

In some examples, the sensor data 236 includes "raw" data obtained from the sensors, and the "raw" data is processed by the object tracking component 220 to determine the hand tracking data 238. For example, the sensor data 236 includes image data, and the image data is processed by the object tracking component 220 to generate the hand tracking data 238.

The hand tracking data 238 can include detection information, such as details of detected hands and bounding box information. For example, during a detection phase, the object tracking component 220 generates 2D position data indicating a location where the hand was detected within one or more images. The object tracking component 220 can generate coordinates defining the bounding box, or part thereof.

Furthermore, during the detection phase, the object tracking component 220 can generate a confidence value that is indicative of the likelihood that a detected object is indeed a hand. For example, the object tracking component 220 can run a hand detection machine learning model that is trained, using supervised learning, to classify a detected object as a hand or non-hand, together with a confidence value.

The hand tracking data 238 can also include more detailed information, such as 3D positional data. For example, during a tracking phase, the object tracking component 220 generates the 3D positions of a plurality of joints of the hand. The positions can be tracked over time to provide a time-based sequence of positions. During the tracking phase, the object tracking component 220 may track the pose (e.g., position and orientation) of the hand over time. The hand tracking data 238 may also include chirality information, such as whether a detected hand is estimated to be a left hand or a right hand. In some examples, after the detection phase, the object tracking component 220 tracks a hand by using a landmark detection machine learning model to obtain and track the joint positions (e.g., respective sets of 3D coordinates with their associated joint identifiers) of the hand. This enables the object tracking component 220 to detect, for example, various hand gestures.

Accordingly, the sensor data 236 and/or the hand tracking data 238 may include data captured by one or more sensors that describe (or can be processed to describe) the movement, position, orientation, or other kinematic properties of a human hand. In some examples, the hand tracking data 238 also includes calibration data. For example, a scale estimate is generated for a hand to enable the tracking thereof during the tracking phase, as described above.

The hand rejection settings 240 may include parameters and thresholds used by the hand rejection component 222 to distinguish between user hands and non-user hands. The hand rejection settings 240 can include rules and parameters for applying one or more rejection filters, such as one or more distance-based filters, one or more relative hand position filters, one or more entry region-based filters, one or more relative hand and arm position filters, or combinations thereof. In some examples, the hand rejection settings 240 are adjustable. For example, a predetermined sequence in which the rejection filters are run can be adjusted for a particular device or a particular use case. Examples of hand rejection settings 240 are further described with reference to FIG. 4.

The hand tracking settings 242 may include configuration parameters for the egocentric hand tracking process. The hand tracking settings 242 can define, for example, the frequency of hand position updates, the level of detail in tracking, predetermined gestures to detect, and sensitivity thresholds for detecting hand movements and gestures. In some examples, the hand tracking settings 242 define operations to be performed during a detection phase (e.g., identify and object and report on its 2D position relative to the camera) and operations to be performed during a tracking phase (e.g., track the pose of the object over time as it moves in the real world).

One or more of the components described herein may be implemented using hardware (e.g., a processor of a machine) or a combination of hardware and software. For example, a component described herein may configure a processor to perform the operations described herein for that component. Moreover, two or more of these components may be combined into a single component, and the functions described herein for a single component may be subdivided among multiple components. Furthermore, according to various examples, components described herein as being implemented within a single machine, database, component, or device may be distributed across multiple machines, databases, components, or devices.

Figure 3:
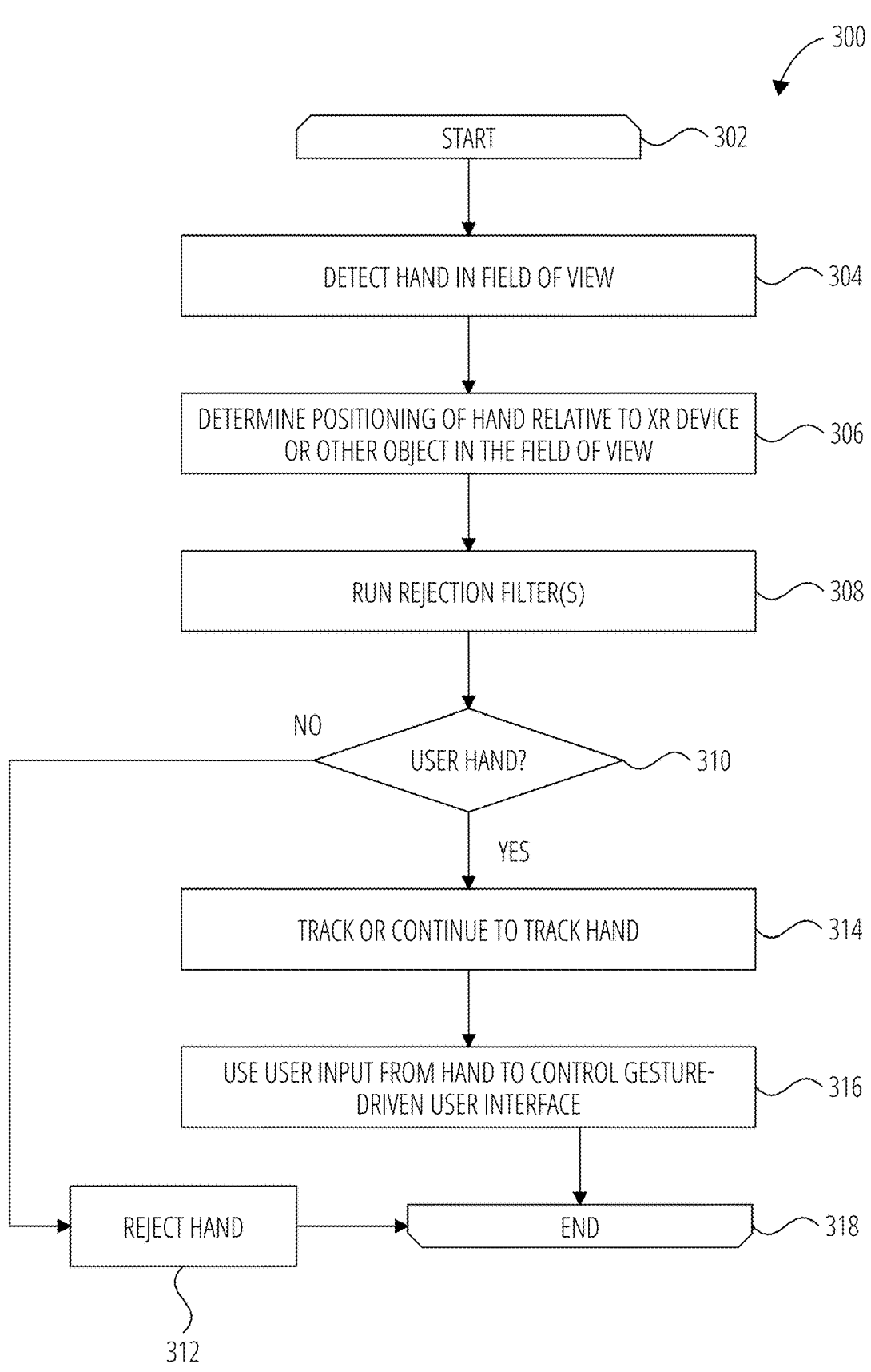
FIG. 3 is a flowchart illustrating operations of a method for determining whether a hand in a field of view of an XR device is a non-user hand, according to some examples.

FIG. 3 is a flowchart illustrating operations of a method 300 for determining whether a hand in a field of view of an XR device is a non-user hand, according to some examples. By way of example and not limitation, aspects of the method 300 may be performed by components, devices, systems, or networks, shown in FIG. 1 and FIG. 2, and they may accordingly be referenced below.

The method 300 commences at opening loop operation 302. For example, the user 106 wears the XR device 110 and starts a new user session. A "user session" is used herein to refer to an operation of an application during periods of time. For example, a user session refers to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In another example, the user session starts when the user runs or starts an AR application, or runs or starts a particular feature of the AR application, and stops when the user ends the AR application or stops the particular features of the AR application.

The XR device 110 continuously obtains tracking data during the user session. For example, images are captured by one or more of the image sensors 210, and the images are processed to identify objects of interest (or potential interest) in the field of view of the XR device 110. In some examples, the XR device 110 initially processes images to obtain 2D position information for the object during a detection phase, such as bounding box information represented using (x, y) coordinates.

Once (and if) the XR device 110 proceeds to a tracking phase for a particular object, the XR device 110 may perform additional processing to obtain more detailed information describing the object. For example, the XR device 110 generates 3D position information and/or orientation information. The XR device 110 can use cameras that are spaced a distance apart and simultaneously capture images from slightly different angles, allowing for principles of stereoscopic vision to be applied to facilitate obtaining 3D coordinates of object landmarks. As another example, the XR device 110 can use a scale estimate that was generated for the object during a calibration phase to transform 2D position information (e.g., from a single camera stream) to 3D position information, and the 3D position information (e.g., hand landmarks) can be used to track the pose of an object (e.g., its position and orientation over time).

When one or both hands of the user 106 are within the field of view of the XR device 110, the XR device 110 performs egocentric hand tracking to track one or both hands of the user 106. For example, the user 106 manipulates a gesture-driven user interface by way of various hand gestures. The XR device 110 is configured to check whether a newly detected hand is a user hand so as to establish whether the newly detected hand is relevant to the egocentric hand tracking process.

At operation 304, the XR device 110 detects a hand that has entered its field of view. The method 300 proceeds to operation 306, where the XR device 110 determines the positioning of the hand relative to the XR device 110 or relative to another object in the field of view.

In some examples, the XR device 110 only proceeds from operation 304 to operation 306 if a confidence value associated with the initial detection of the hand meets or exceeds a threshold value. For example, the object tracking component 220 runs an object detection machine learning model that identifies the hand and returns a confidence value. The confidence value indicates the level of confidence, or the probability, of the detected object being a hand. If the confidence value is below the threshold value, the XR device 110 disregards the detection and does not proceed to operation 306. If the confidence value meets or exceeds the threshold value, the XR device 110 triggers operation 306.

The positioning of the hand relative to the XR device 110, the positioning of the hand relative to another object, or both, may then be applied by the hand rejection component 222 of the XR device 110 to determine whether the newly detected hand is a user hand or a non-user hand. The positioning of the hand relative to the XR device can be represented as the absolute distance (in 3D) between the hand and the XR device, or based on 2D position information (e.g., by considering the size of the bounding box relative to an image frame). The positioning of the hand relative to the XR device can also be assessed by detecting a region in which the hand is located within an image. The positioning of the hand relative to another object can, for example, relate to the positioning of the hand relative to another hand that is already being tracked by the XR device 110.

At operation 308, the XR device 110 uses the information obtained during operation 306 to run one or more rejection filters, as described in greater detail elsewhere. The rejection filter, or rejection filters, indicate whether the hand should be rejected on the basis that it is a non-user hand (or sufficiently likely to be a non-user hand).

If the hand rejection component 222 determines, at decision operation 310, that the hand is a non-user hand, the hand is rejected at operation 312. For example, the hand rejection component 222 communicates the determination to the control system 224, which in turn instructs the object tracking component 220 not to include the hand in the egocentric hand tracking process of the XR device 110. This ensures that movements or gestures of the hand do not influence the XR experience of the user 106. This also ensures that the XR device 110 does not waste further resources in tracking the non-user hand. The method 300 concludes at closing loop operation 318 after operation 312.

By contrast, if the hand rejection component 222 determines, at decision operation 310, that the hand is a user hand, the method 300 proceeds to operation 314 where the XR device 110 tracks, or continues to track (if tracking has already commenced), the hand. For example, the hand rejection component 222 runs the rejection filters and establishes that the hand cannot be rejected based on the results of any of the rejection filters.

The object tracking component 220 then tracks the hand as part of the egocentric hand tracking process. This includes using user input provided via the hand of the user 106 to control the gesture-driven user interface of the XR device 110. For example, the object tracking component 220 communicates detected gestures to the AR application 226, and, in response, the AR application 226 causes generation or adjustment of virtual content within the gesture-driven user interface (or other views provided by the AR application 226). The method 300 concludes at closing loop operation 318 after operation 316.

Figure 4:
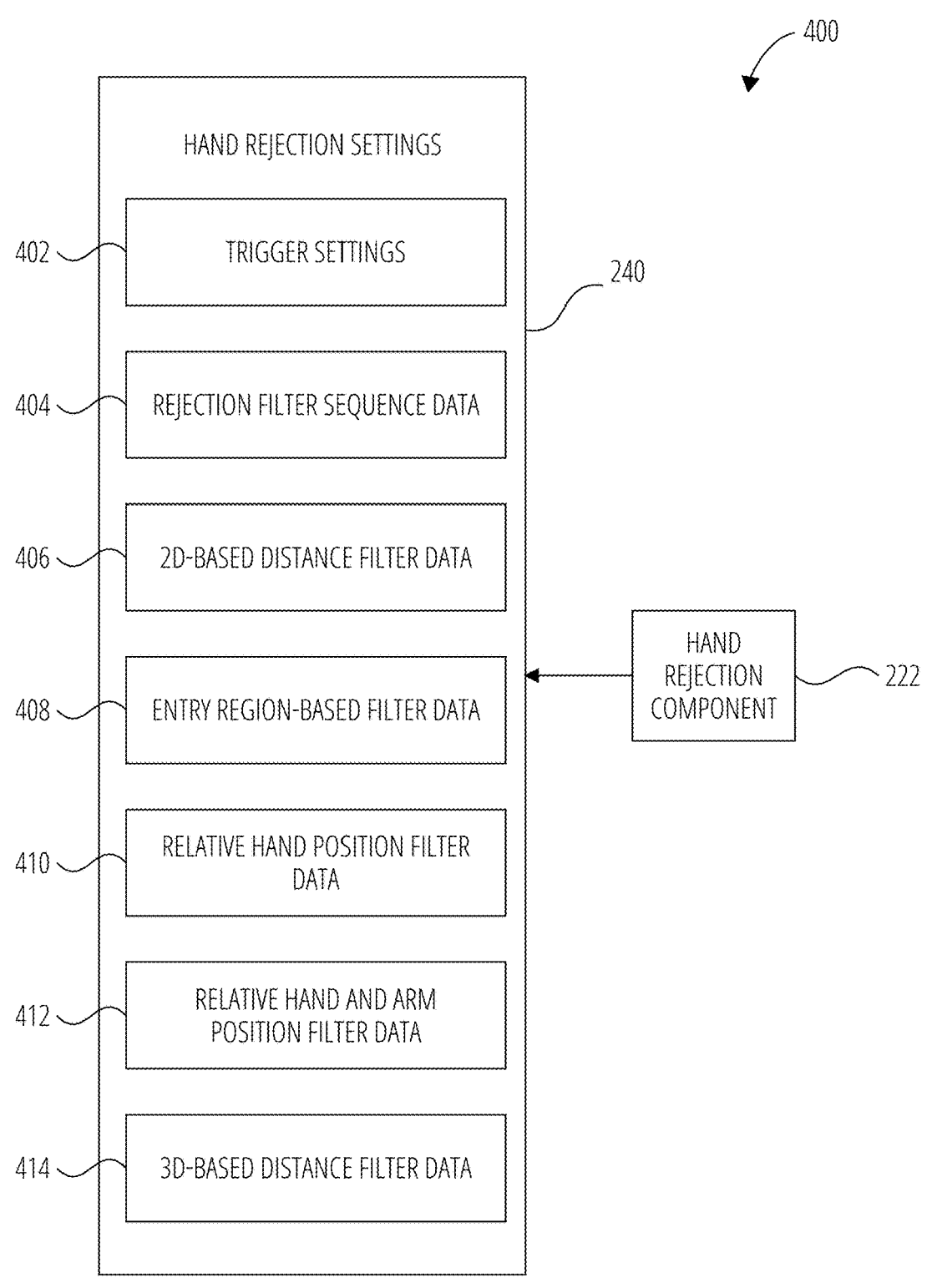
FIG. 4 is a block diagram illustrating hand rejection settings of an XR device, according to some examples.

FIG. 4 is a diagram 400 that illustrates hand rejection settings 240 of the XR device 110, according to some examples. During a user session, the hand rejection component 222 uses the hand rejection settings 240 to determine whether a hand is a non-user hand (or is likely to be a non-user hand). The hand rejection settings 240 of FIG. 4 include trigger settings 402, rejection filter sequence data 404, 2D-based distance filter data 406, entry region-based filter data 408, relative hand position filter data 410, relative hand and arm position filter data 412, and 3D-based distance filter data 414.

The trigger settings 402 specify when to trigger one or more rejection filters. The trigger settings 402 may further specify when to cease running rejection filters. For example, the trigger settings 402 specify that the hand rejection component 222 is to commence with a rejection filter sequence in response to the detection of a new hand, and should cease running any rejection filters remaining in the sequence if one of the rejection filters returns a rejection outcome (e.g., the hand rejection component 222 determines, based on one of the rejection filters, that the hand is a non-user hand).

The rejection filter sequence data 404 specifies a predetermined sequence in which to run the rejection filters. In some examples, the hand rejection component 222 runs the rejection filters according to the predetermined sequence, one after another, until a rejection outcome is generated. Alternatively, if no rejection outcome is generated by any of the rejection filters, the hand rejection component 222 completes all rejection filters defined by the sequence.

In some examples, for a hand to be excluded from egocentric hand tracking by the XR device 110, multiple rejections are needed. For example, if at least two of the rejection filters return a rejection of the hand, the XR device 110 classifies the hand as a non-user hand, while if only one of the rejection filters returns a rejection, the XR device 110 does not classify the hand as a non-user hand.

An example of a predetermined sequence is: (1) 2D-based distance filter, (2) entry region-based filter, (3) relative hand position filter, (4) relative hand and arm position filter, and (5) 3D-based distance filter. In some examples, the predetermined sequence is designed to enable, where relevant, the XR device 110 to reject a non-user hand as early as possible within a tracking pipeline. For example, the 2D-based distance filter is executed after the detection phase, but before the tracking phase, since it does not require 3D landmark information, while the 3D-based distance filter is only executed during the tracking phase once 3D landmark information becomes available. Accordingly, in some examples, the predetermined sequence specifies that the 2D-based distance filter is to be run before the 3D-based distance filter.

In some examples, the rejection filter sequence data 404 specifies that one or more rejection filters are to be run in parallel, or partially in parallel. Furthermore, the rejection filter sequence data 404 can be configurable or adjustable. In some examples, different sequences are defined for different use cases. For example, a first type of AR application applies a first sequence of rejection filters, while a second type of AR application applies a second (different) sequence of rejection filters. As another example, a first type of AR application applies a full set of available rejection filters, while a second type of AR application only applies a subset of the available rejection filters.

The 2D-based distance filter data 406 includes settings, rules, values, thresholds, or configurations for applying at least one 2D-based distance filter. One example of a 2D-based distance filter is a filter that assesses the size (e.g., 2D area in camera image space) of a bounding box that was generated by the object tracking component 220 for a detected hand. In some examples, there is a relationship between the size of the bounding box and the distance between the hand and the XR device. For example, if the size of the bounding box within a captured image does not meet a threshold value, the hand is determined to be too far away from the XR device 110 to be a user hand.

Thus, the 2D-based distance filter can specify that a hand is to be rejected if its bounding box is too small. In other words, the hand is determined not to be within a plausible range from the XR device 110. In some examples, the threshold size of the bounding box is adjustable. For example, a hand scale estimate obtained during a calibration operation can be used by the XR device 110 to automatically set the threshold size.

The entry region-based filter data 408 includes settings, rules, values, thresholds, or configurations for applying at least one entry region-based filter. A left hand typically appears towards the left side of the image, while a right hand typically appears towards the right side of the image.

One example of an entry region-based filter is a filter that assesses the chirality of a hand, and determines whether to reject the hand based on the chirality of the hand and the region of the image in which it appears. For example, if the newly detected hand is a left hand, and it is detected in the upper right corner of the image, the entry region-based filter returns a rejection outcome. Another example of an entry region-based filter is a filter that assesses the entry region of the hand based on its chirality and its horizontal position within the image. For example, the entry region-based filter specifies a linear decision function to be applied by the hand rejection component 222, where the slope is proportional to the x-coordinates of the hand in the image. If the linear decision function returns a value that meets a certain predetermined condition, the hand is determined to be a non-user hand, and thus rejected.

The relative hand position filter data 410 includes settings, rules, values, thresholds, or configurations for applying at least one relative hand position filter. An example of a relative hand position filter is a filter that determines whether to reject the hand based on the chirality of the hand and its position relative to a user hand that is already being tracked. For example, if the newly detected hand is a left hand, but it is detected to the right of a right hand that is already being tracked (from the perspective of the user), the entry region-based filter returns a rejection outcome.

The relative hand and arm position filter data 412 includes settings, rules, values, thresholds, or configurations for applying at least one relative hand and arm position filter. A relative hand position filter assesses both the detected hand and its corresponding arm (e.g., the arm connected to the hand) to determine whether the hand belongs to a user or a non-user. For example, the hand rejection component 222 analyzes the arm and determines a vector or other indicator that represents the direction in which the arm extends from the hand. If the indicator extends in a certain direction away from the body of the user, or is outside of an acceptable directional range, it is unlikely to be the hand of the user, and the hand is determined to be non-user hand. If the indicator extends in a certain direction towards the body of the user, or is within an acceptable directional range, the hand is likely to be the hand of the user, and the hand is thus not rejected by the relative hand position filter.

The 3D-based distance filter data 414 includes settings, rules, values, thresholds, or configurations for applying at least one 3D-based distance filter. A 3D-based distance filter assesses absolute distance. For example, the 3D-based distance filter data 414 specifies a threshold distance, or range, for a hand in relation to the XR device 110 (or in relation to the user 106 wearing the XR device 110). The threshold distance may be set at a distance that a user hand would be unlikely to reach while the user is wearing the XR device 110. In other words, a user's arm length would be unlikely to allow the user to reach that far away. The hand rejection component 222 determines the absolute distance between the hand and the XR device 110 (or in relation to the user 106), and rejects the hand if the distance exceeds the threshold distance.

Another example of a 3D-based distance filter is a filter that rejects a hand if it is too far away from a user hand that is already being tracked. For example, the 3D-based distance filter data 414 specifies a threshold distance, or range, for a hand in relation to another hand. The threshold distance may be set at a distance that would likely be greater than any possible distance between two hands of the same person. The hand rejection component 222 determines the absolute distance between the two hands, and rejects the newly detected hand if the distance exceeds the threshold distance.

In some examples, the threshold applied by a 3D-based distance filter is adjustable. For example, a hand scale estimate or arm scale estimate obtained during a calibration operation can be used by the XR device 110 to automatically set the threshold.

It is noted that the rejection filters described with reference to FIG. 4 are non-limiting examples, and that other rejection filters, or other combinations of rejection filters, can be utilized in other examples. For example, another rejection filter might consider the general pose of a hand relative to the XR device 110 (e.g., relative to its camera) to determine whether the hand is a user hand. Another example of a rejection filter considers the chirality of the newly detected hand and cause rejection of the hand if it has the same chirality of a user hand that has already been detected and/or is already being tracked. For example, if the XR device 110 is already tracking a right hand of a user, and the XR device 110 detects another right hand of a (different) person, the newly detected hand is rejected.

Figure 5:
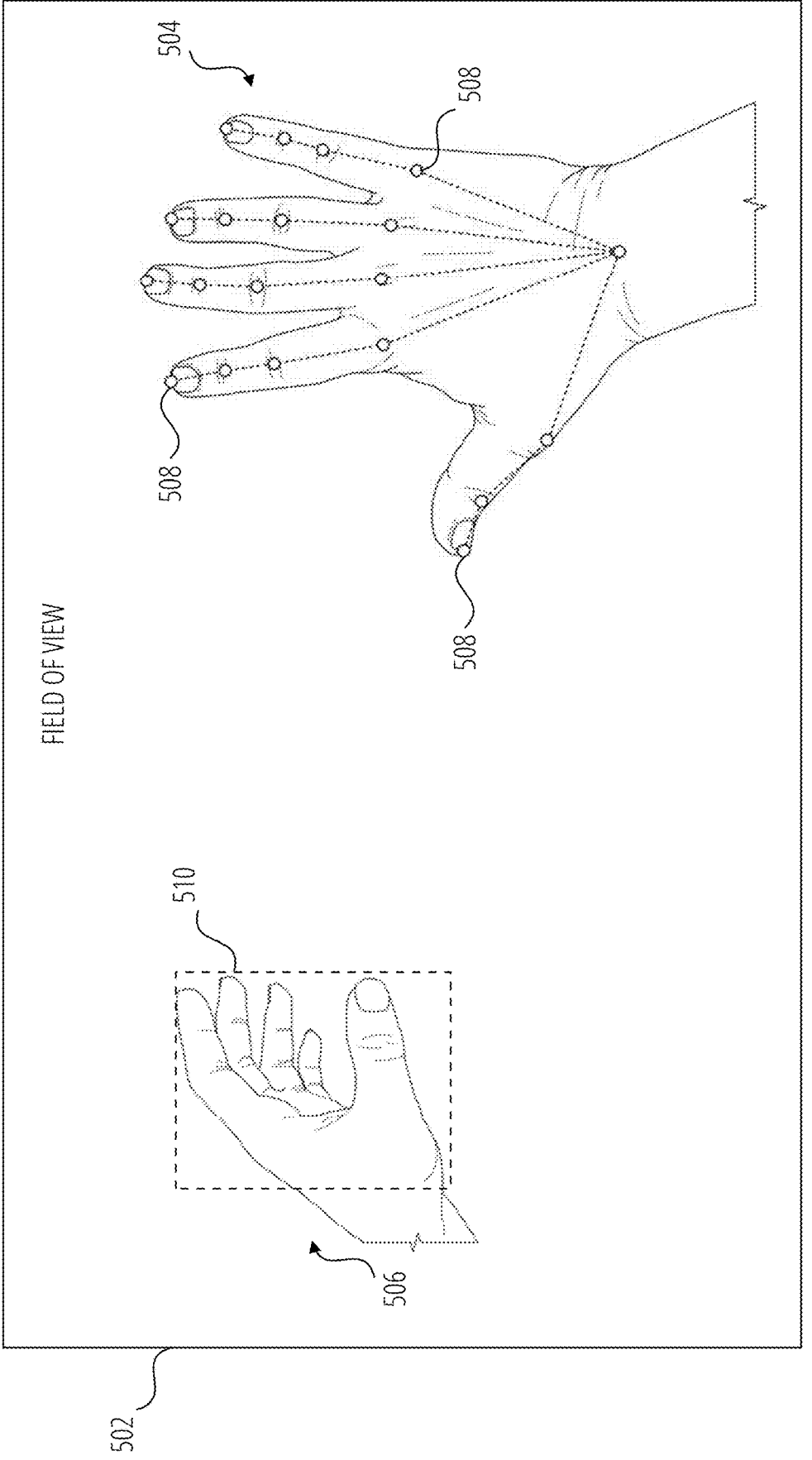
FIG. 5 illustrates, in simplified form, a field of view of an XR device according to some examples, wherein a user hand and a non-user hand are shown in the field of view.
Figure 6:
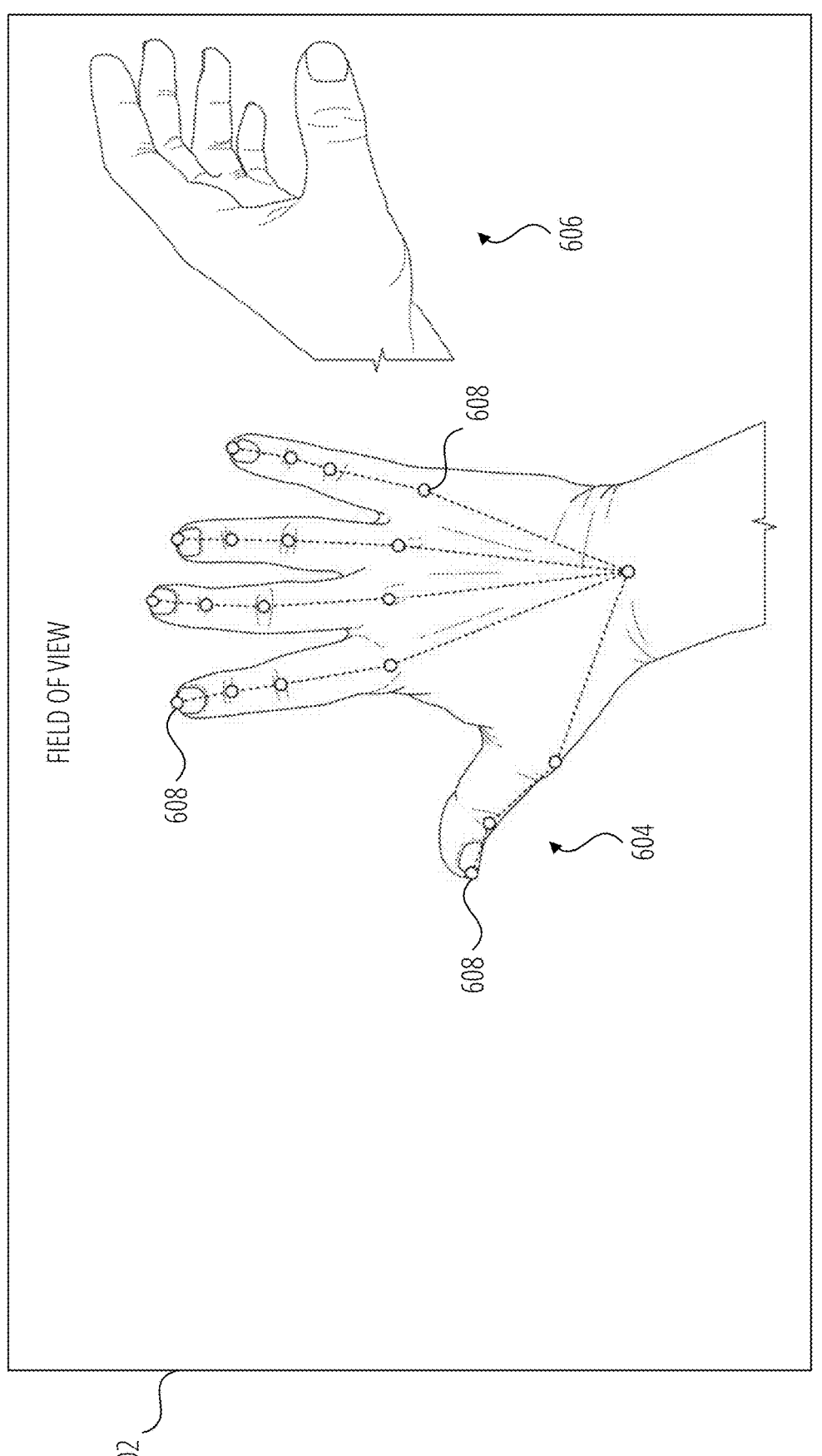
FIG. 6 illustrates, in simplified form, a field of view of an XR device according to some examples, wherein a user hand and a non-user hand are shown in the field of view.
Figure 7:
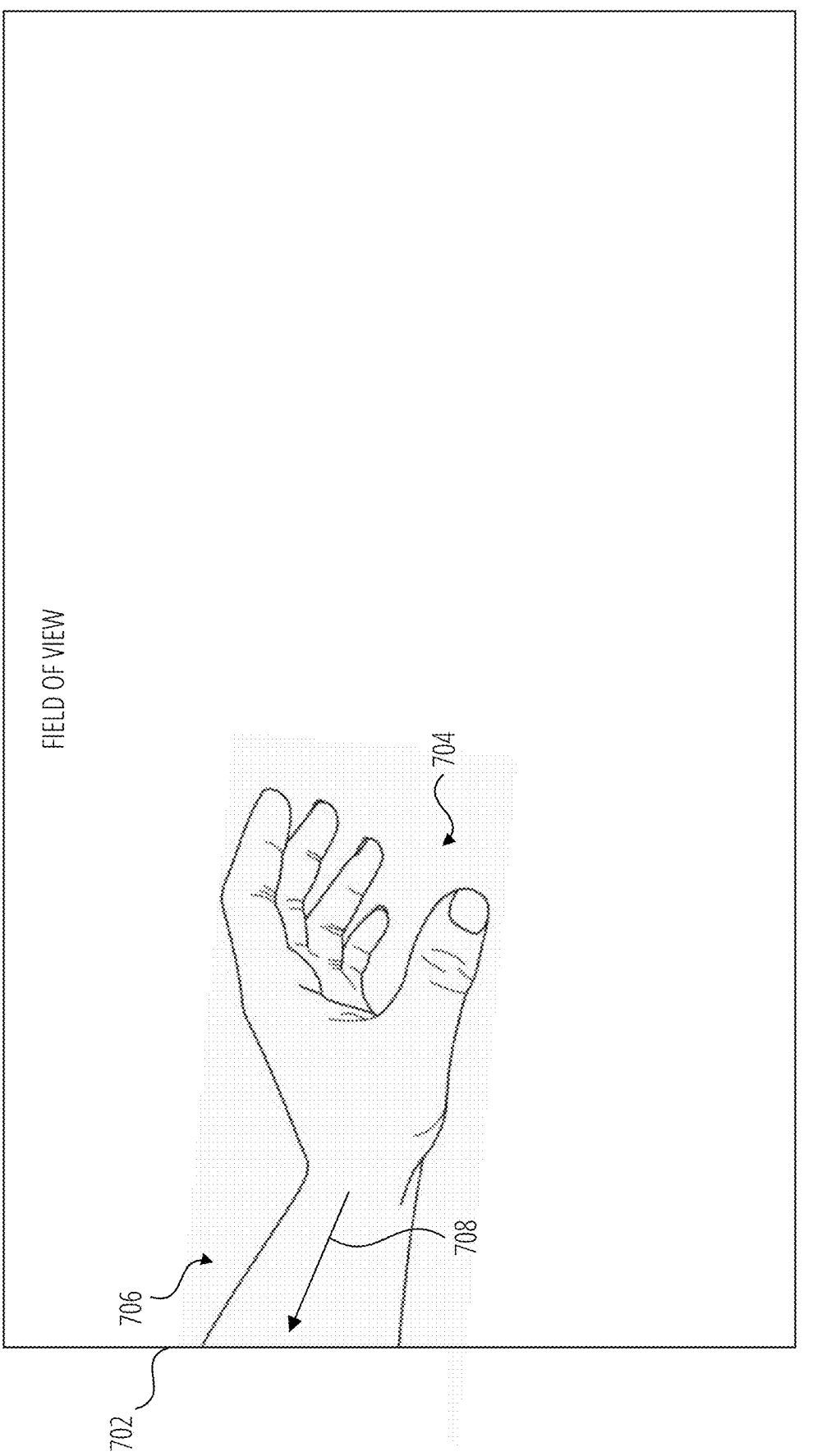
FIG. 7 illustrates, in simplified form, a field of view of an XR device according to some examples, wherein a non-user hand is shown in the field of view.

FIGS. 5-7 provide simplified illustrations to facilitate understanding of certain aspects described herein. FIGS. 5-7 each show a single camera view, but it will be appreciated that the XR device 110 may capture objects from multiple perspectives using various cameras. In the examples of FIGS. 5-7, the XR device 110 is an AR device (e.g., AR glasses) with a transparent or semi-transparent display that enables a user to see through the transparent or semi-transparent display to view the real-world environment 102. Additional information or objects (e.g., virtual objects such as 3D renderings, images, video, text, and so forth) are shown on the display and appear as a part of, and/or overlaid upon, the real-world environment 102 to provide an AR experience for the user 106. The display can, for example, include a waveguide that receives a light beam from a projector, but any appropriate display for presenting virtual content to the wearer of the XR device 110 may be used.

Referring firstly to FIG. 5, FIG. 5 illustrates a field of view 502 of the XR device 110, according to some examples. A user hand 504 and a non-user hand 506 both appear in, and are visible to, the user 106 in the real-world environment 102. The user hand 504 and the non-user hand 506 are captured in the field of view 502 of the XR device 110.

The XR device 110 has previously detected the user hand 504 and is performing egocentric hand tracking with respect to the user hand 504. This process includes, for example, identifying and tracking various landmarks 508 (illustrated by circular elements in FIG. 5) as they move within the real-world environment 102. This enables the XR device 110 to track the pose of the user hand 504 to detect gestures, user inputs, controls, and the like, to provide the AR experience.

The XR device 110 runs one or more rejection filters to determine whether the non-user hand 506 should be tracked in the context of the egocentric hand tracking process. In some examples, the XR device 110 runs a 2D-based distance filter. In the case of FIG. 5, the XR device 110 performs hand detection to detect the non-user hand 506, and then generates a bounding element in the example form of bounding box 510 for the non-user hand 506 based on the detection. The XR device 110 generates 2D coordinates for the bounding box 510. This allows the XR device 110 to calculate the area of the bounding box 510.

If the area of the bounding box 510 satisfies a predetermined condition, the hand rejection component 222 of the XR device 110 rejects the non-user hand 506. For example, if the area of the bounding box 510 is smaller than a predetermined threshold, the XR device 110 rejects the non-user hand 506 on the basis that it is likely to be too far away from the XR device 110 to be a user hand. Conversely, if the area of the bounding box 510 meets or exceeds the predetermined threshold, the XR device 110 does not reject the non-user hand 506 based on the 2D-based distance filter. Instead, the XR device 110 may move on to the next rejection filter. Alternatively, if no further rejection filters are to be applied, the XR device 110 accepts the non-user hand 506 as a user hand (which is not the case in the examples of FIG. 5).

In some examples, the XR device 110 runs a 3D-based distance filter. In the case of FIG. 5, after the detection phase during which the bounding box 510 is generated, the XR device 110 starts tracking the non-user hand 506 during a tracking phase to determine its 3D position or predicted 3D position. For example, the XR device 110 determines or predicts the position of a predetermined landmark on the non-user hand 506 relative to the XR device 110, such as the wrist joint, the index finger metacarpal joint, or the thumb metacarpal joint. This enables the XR device 110 to calculate the absolute distance (or estimated absolute distance) of the non-user hand 506 relative to the XR device 110 or relative to the body of the user 106 (e.g., relative to a central point on the upper body of the user 106 as estimated by the XR device 110).

If the absolute distance exceeds a predetermined threshold, the hand rejection component 222 of the XR device 110 rejects the non-user hand 506 on the basis that it is likely to be too far away to be a user hand. For instance, the threshold might be set to slightly beyond the average arm's length to account for variations in user physiology and to minimize false rejections of valid user hands. In other cases, the threshold might be personalized for the user 106. Conversely, if the XR device 110 determines that the non-user hand 506 is sufficiently close, it does not reject the non-user hand 506 based on the 3D-based distance filter.

It is noted that the 2D-based distance filter can, at least in some examples, be a useful rejection filter to apply relatively early in the tracking pipeline, since it does not rely on 3D position data to be generated by the XR device 110. Accordingly, it can allow for the non-user hand 506 to be rejected relatively early to save computing resources. It is further noted that the 3D-based distance filter can provide accurate results since it relies on absolute distance instead of the area of a zone associated with a hand (which might be subject to variability resulting from different hand poses). In some examples, the 3D-based distance filter can be applied to confirm or supplement the result of the 2D-based distance filter.

FIG. 6 illustrates a field of view 602 of the XR device 110, according to some examples. A user hand 604 and a non-user hand 606 both appear in, and are visible to, the user 106 in the real-world environment 102. The user hand 604 and the non-user hand 606 are captured in the field of view 602 of the XR device 110.

The XR device 110 has previously detected the user hand 604 and is performing egocentric hand tracking with respect to the user hand 604. This process includes, for example, identifying and tracking various landmarks 608 (illustrated by circular elements in FIG. 6) as they move within the real-world environment 102.

In some examples, the XR device 110 applies a relative hand position filter. In the case of FIG. 5, the XR device 110 applies the relative hand position filter by checking the chirality of the non-user hand 606 as well as its position relative to the user hand 604. Specifically, the XR device 110 detects that the non-user hand 606 is a left hand, and that it has appeared in the scene on the right side of the user hand 604 (from the perspective of the user 106).

According to rules specified for the relative hand position filter, the detected positioning of the non-user hand 606 relative to the user hand 604 is invalid. For example, the rules include a predetermined condition specifying that a hand should be rejected if it first appears in the scene on the "wrong" side of an already tracked hand (considering the chirality of the new hand).

The chirality of the non-user hand 606 can be detected or estimated using a trained machine learning model, as described elsewhere. In some examples, the chirality of the non-user hand 606 is estimated or selected based on the chirality of the user hand 604. For example, if the user hand 604 has already been processed and determined to be a right hand, the XR device 110 deems the non-user hand 606 to be a left hand for purposes of applying the relative hand position filter.

As a result of the detected spatial relationship between the user hand 604 and the non-user hand 606, the hand rejection component 222 of the XR device 110 rejects the non-user hand 606 based on the relative hand position filter. Conversely, if the XR device 110 detected the non-user hand 606 as first appearing to the left of the user hand 604, the non-user hand 606 would not have been rejected based on the relative hand position filter.

In some examples, the relative hand position filter assesses both the chirality of the hand and its horizontal positioning within the scene (e.g., in the captured image), as opposed to its positioning relative to another hand. For example, the horizontal positioning of the hand (e.g., one or more x-coordinates) is provided as input to a decision function to generate a value indicative of a likelihood that the positioning of the hand is invalid. For instance, for a left hand, the likelihood of an invalid position increases as the x-coordinate moves further to the right of the image (since the left hand typically appears towards the left of the image). For a right hand, the likelihood of an invalid position increases as the x-coordinate moves further to the left of the image. It will be appreciated that the decision function may be adjustable to accommodate different use cases or to reduce the likelihood of false rejections of valid user hands.

The "positioning" of the non-user hand 606 to be assessed by the hand rejection component 222 can be based on an entry region of the non-user hand 606. The entry region can be a region (e.g., bounding element) or location (e.g., x-coordinate) at which the non-user hand 606 is first detected by the XR device 110.

FIG. 7 illustrates a field of view 702 of the XR device 110, according to some examples. A non-user hand 704 is captured in the field of view 702 of the XR device 110, and is visible to the user 106 in the real-world environment 102.

In some examples, the XR device 110 applies a relative hand and arm position filter to determine whether to reject the non-user hand 704. In the case of FIG. 7, the XR device 110 applies the relative hand position filter as follows to reject the non-user hand 704:

The XR device 110 detects the non-user hand 704 during a detection phase.

The XR device 110 detects the arm 706 as the arm belonging to the non-user hand 704.

The hand rejection component 222 triggers the relative hand position filter.

The hand rejection component 222 assesses the positioning of the arm 706. Based on the positioning of the arm 706 relative to at least one of the non-user hand 704, the body of the user 106, or the XR device 110, the hand rejection component 222 determines that the non-user hand 704 is to be rejected.

Various techniques may be applied to assess the positioning of the arm 706 and to decide whether to generate a rejection outcome. For example, and as shown in FIG. 7, the XR device 110 generates a directional indicator 708 (e.g., a vector extending from the wrist in the direction of the arm) that indicates the direction or angle at which the arm 706 extends away from the non-user hand 704. It is evident in FIG. 7 that the arm 706 extends from the wrist of the non-user hand 704 and generally away from the XR device 110 towards the front of the user 106. It is thus unlikely that the non-user hand 704 is connected to the body of the user 106 wearing the XR device 110.

The relative hand position filter may specify rules including an acceptable directional or angular range. In the case of FIG. 7, the directional indicator 708 is outside of the acceptable range. This indicates that the non-user hand 704 is likely to belong to another person, and the non-user hand 704 is rejected.

In other words, the relative spatial positioning of the non-user hand 704 and the arm 706 is inconsistent with what would be expected for user 106 from an egocentric tracking perspective. It is noted that the relative hand position filter can be useful in scenarios where other rejection filters might not provide conclusive results, such as where a user hand and a non-user hand are located at similar distances from the user 106 and are not positioned unconventionally from a chirality perspective.

Figure 8:
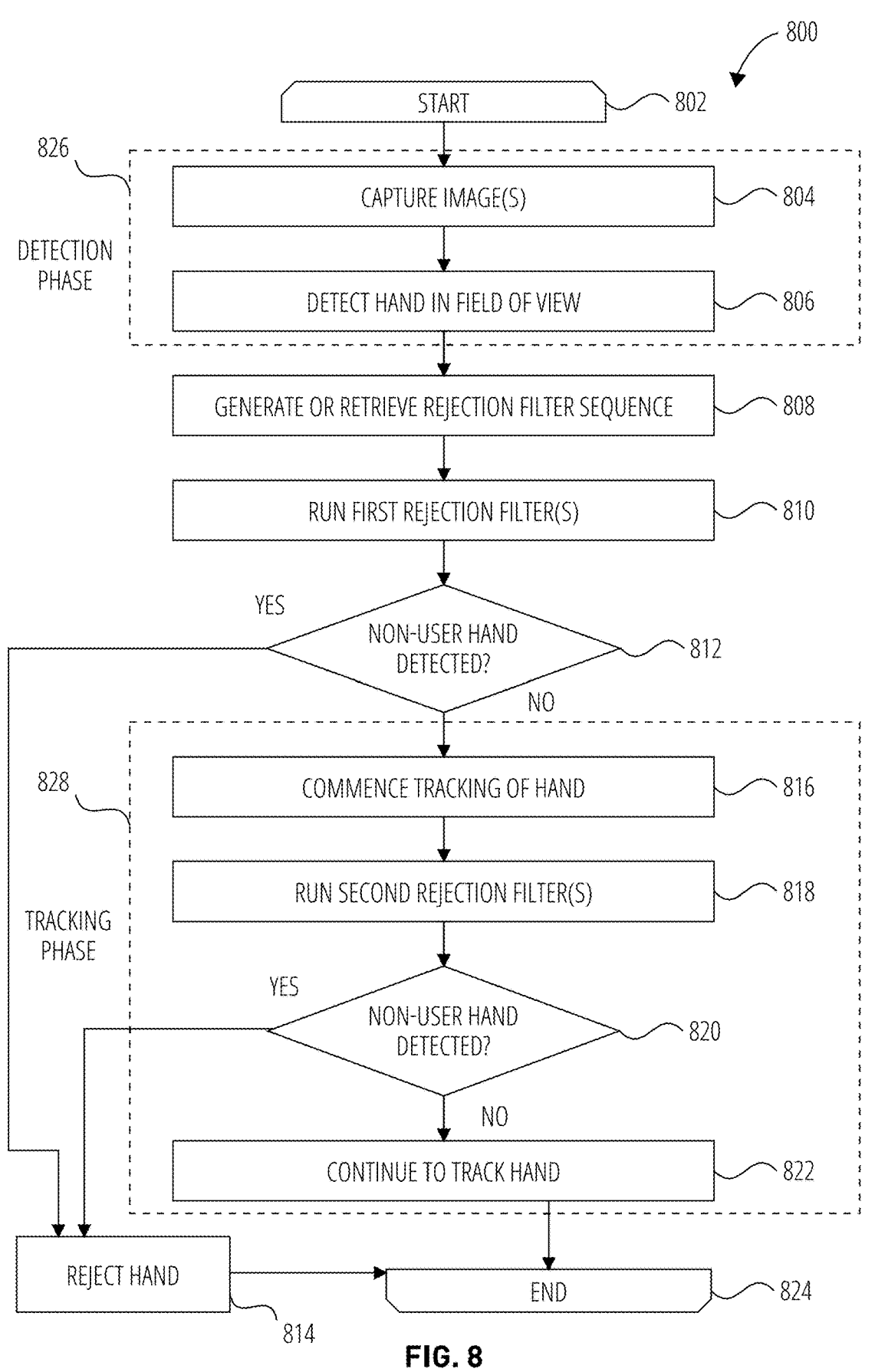
FIG. 8 is a flowchart illustrating operations of a method for executing multiple rejection filters to determine whether a hand in a field of view of an XR device is a non-user hand, according to some examples.

FIG. 8 is a flowchart illustrating operations of a method 800 for executing multiple rejection filters to determine whether a hand in a field of view of an XR device is a non-user hand, according to some examples. By way of example and not limitation, aspects of the method 800 may be performed by components, devices, systems, or networks, shown in FIG. 1 and FIG. 2, and they may accordingly be referenced below.

The method 800 commences at opening loop operation 802. For example, the user 106 wears the XR device 110 and starts a new user session. During a detection phase 826, the XR device 110 captures one or more images using the image sensor 210 (operation 804) and detects a hand in its field of view (operation 806), as described in greater detail elsewhere in the present disclosure.

In response to the detection of the hand, the control system 224 of the XR device 110 instructs the hand rejection component 222 to start a rejection filter sequence. The hand rejection component 222 retrieves a stored rejection filter sequence at operation 808. In the case of FIG. 8, the sequence includes two subsets: a first subset to be run after the detection phase 826, but before a tracking phase 828 commences, and a second subset to be run during the tracking phase 828. Each subset can include one or more different rejection filters.

At operation 810, the hand rejection component 222 runs the first subset of rejection filters. Merely as an example, the hand rejection component 222 runs a 2D-based distance filter and a relative hand position filter. At decision operation 812, the hand rejection component 222 checks the results of the first subset of rejection filters to establish whether a non-user hand has been detected. If so, the method 800 proceeds to operation 814 where the hand rejection component 222 rejects the hand. For example, the hand rejection component 222 or the control system 224 communicates with the object tracking component 220 to cause the hand to be excluded from egocentric hand tracking.

If, after execution of the first subset of rejection filters, the hand rejection component 222 finds that there has been no detection of a non-user hand, the method 800 proceeds to the tracking phase 828 and the XR device 110 uses the object tracking component 220 to start tracking the hand (operation 816). This enables the XR device 110 to obtain additional information regarding the position or orientation of the hand. For example, the object tracking component 220 can track, estimate, or predict the pose of the hand over time during at least part of the user session.

The hand rejection component 222 then runs the second subset of rejection filters, commencing at operation 818. In some examples, the second subset is executed during the tracking phase, because the rejection filters in the second subset rely on or benefit from the additional tracking data obtained during the tracking phase 828. Merely as an example, the hand rejection component 222 runs two variations of a 3D-based distance filter to determine whether the hand is outside of an acceptable distance range (e.g., taken from the user 106 or from the XR device 110).

At decision operation 820, the hand rejection component 222 checks the results of the second subset of rejection filters to establish whether a non-user hand has been detected. If so, the method 800 proceeds to operation 814 where the hand rejection component 222 rejects the hand. If, after execution of the second subset of rejection filters, the hand rejection component 222 still cannot establish that the hand is a non-user hand, the hand rejection component 222 or the control system 224 instructs the object tracking component 220 to treat the hand as a user hand.

Accordingly, if the hand "passes" all the rejection filters with no rejection result being generated, the object tracking component 220 continues to track the hand (operation 822) in the egocentric hand tracking process of the XR device 110. The method 800 concludes at closing loop operation 824.

Examples in the present disclosure provide a systematic method to reject non-user hands in an XR context. In some examples, the non-user hand is rejected as early as possible to free up resources in the XR system. By implementing a multi-stage rejection system for non-user hands, the XR device can significantly reduce its computational load and power consumption, such as by avoiding unnecessary processing of irrelevant hand data. Furthermore, examples described herein can improve the overall reliability or integrity of a gesture-driven user interface or an XR experience more generally.

Figure 9:
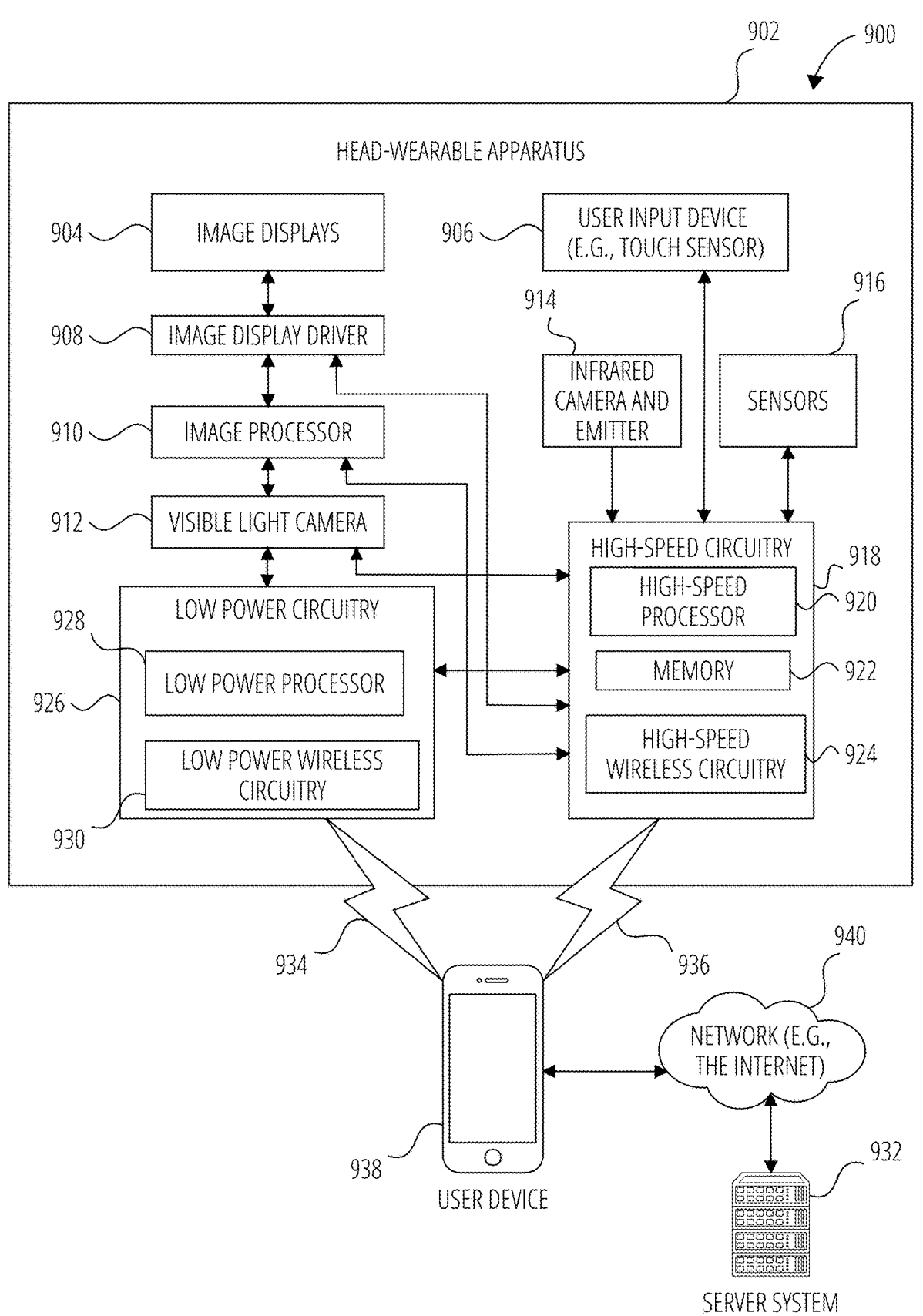
FIG. 9 illustrates a network environment in which a head-wearable apparatus can be implemented, according to some examples.

FIG. 9 illustrates a network environment 900 in which a head-wearable apparatus 902, such as a head-wearable XR device, can be implemented according to some examples. FIG. 9 provides a high-level functional block diagram of an example head-wearable apparatus 902 communicatively coupled to a mobile user device 938 and a server system 932 via a suitable network 940. One or more of the techniques described herein may be performed using the head-wearable apparatus 902 or a network of devices similar to those shown in FIG. 9.

The head-wearable apparatus 902 includes a camera, such as at least one of a visible light camera 912 and an infrared camera and emitter 914 (or multiple cameras). The head-wearable apparatus 902 includes other sensors 916, such as motion sensors or eye tracking sensors. The user device 938 can be capable of connecting with head-wearable apparatus 902 using both a communication link 934 and a communication link 936. The user device 938 is connected to the server system 932 via the network 940. The network 940 may include any combination of wired and wireless connections.

The head-wearable apparatus 902 includes a display arrangement that has several components. For example, the arrangement includes two image displays 904 of an optical assembly. The two displays include one associated with the left lateral side and one associated with the right lateral side of the head-wearable apparatus 902. The head-wearable apparatus 902 also includes an image display driver 908, an image processor 910, low power circuitry 926, and high-speed circuitry 918. The image displays 904 are for presenting images and videos, including an image that can provide a graphical user interface to a user of the head-wearable apparatus 902.

The image display driver 908 commands and controls the image display of each of the image displays 904. The image display driver 908 may deliver image data directly to each image display of the image displays 904 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 902 may include a frame and stems (or temples) extending from a lateral side of the frame, or another component to facilitate wearing of the head-wearable apparatus 902 by a user. The head-wearable apparatus 902 of FIG. 9 further includes a user input device 906 (e.g., touch sensor or push button) including an input surface on the head-wearable apparatus 902. The user input device 906 is configured to receive, from the user, an input selection to manipulate the graphical user interface of the presented image.

The components shown in FIG. 9 for the head-wearable apparatus 902 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 902. Left and right sides of the head-wearable apparatus 902 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 902 includes a memory 922 which stores instructions to perform a subset or all of the functions described herein. The memory 922 can also include a storage device. As further shown in FIG. 9, the high-speed circuitry 918 includes a high-speed processor 920, the memory 922, and high-speed wireless circuitry 924. In FIG. 9, the image display driver 908 is coupled to the high-speed circuitry 918 and operated by the high-speed processor 920 in order to drive the left and right image displays of the image displays 904. The high-speed processor 920 may be any processor capable of managing high-speed communications and operation of any general computing system needed for the head-wearable apparatus 902. The high-speed processor 920 includes processing resources needed for managing high-speed data transfers over the communication link 936 to a wireless local area network (WLAN) using high-speed wireless circuitry 924. In certain examples, the high-speed processor 920 executes an operating system such as a LINUX operating system or other such operating system of the head-wearable apparatus 902 and the operating system is stored in memory 922 for execution. In addition to any other responsibilities, the high-speed processor 920 executing a software architecture for the head-wearable apparatus 902 is used to manage data transfers with high-speed wireless circuitry 924. In certain examples, high-speed wireless circuitry 924 is configured to implement Institute of Electrical and Electronic Engineers (IEEE) 902.11 communication standards, also referred to herein as Wi-Fi™. In other examples, other high-speed communications standards may be implemented by high-speed wireless circuitry 924.

The low power wireless circuitry 930 and the high-speed wireless circuitry 924 of the head-wearable apparatus 902 can include short range transceivers (Bluetooth™) and wireless wide, local, or wide area network transceivers (e.g., cellular or Wi-Fi™). The user device 938, including the transceivers communicating via the communication link 934 and communication link 936, may be implemented using details of the architecture of the head-wearable apparatus 902, as can other elements of the network 940.

The memory 922 includes any storage device capable of storing various data and applications, including, among other things, camera data generated by the visible light camera 912, sensors 916, and the image processor 910, as well as images generated for display by the image display driver 908 on the image displays 904. While the memory 922 is shown as integrated with the high-speed circuitry 918, in other examples, the memory 922 may be an independent standalone element of the head-wearable apparatus 902. In certain such examples, electrical routing lines may provide a connection through a chip that includes the high-speed processor 920 from the image processor 910 or low power processor 928 to the memory 922. In other examples, the high-speed processor 920 may manage addressing of memory 922 such that the low power processor 928 will boot the high-speed processor 920 any time that a read or write operation involving memory 922 is needed.

As shown in FIG. 9, the low power processor 928 or high-speed processor 920 of the head-wearable apparatus 902 can be coupled to the camera (e.g., visible light camera 912, or infrared camera and emitter 914), the image display driver 908, the user input device 906 (e.g., touch sensor or push button), and the memory 922. The head-wearable apparatus 902 also includes sensors 916, which may be the motion components 1534, position components 1538, environmental components 1536, or biometric components 1532, e.g., as described below with reference to FIG. 15. In particular, motion components 1534 and position components 1538 are used by the head-wearable apparatus 902 to determine and keep track of the position and orientation of the head-wearable apparatus 902 relative to a frame of reference or another object, in conjunction with a video feed from one of the visible light cameras 912, using for example techniques such as structure from motion (SfM) or VIO.

In some examples, and as shown in FIG. 9, the head-wearable apparatus 902 is connected with a host computer. For example, the head-wearable apparatus 902 is paired with the user device 938 via the communication link 936 or connected to the server system 932 via the network 940. The server system 932 may be one or more computing devices as part of a service or network computing system, for example, that include a processor, a memory, and network communication interface to communicate over the network 940 with the user device 938 and head-wearable apparatus 902.

The user device 938 includes a processor and a network communication interface coupled to the processor. The network communication interface allows for communication over the network 940, communication link 934 or communication link 936. The user device 938 can further store at least portions of the instructions for implementing functionality described herein.

Output components of the head-wearable apparatus 902 include visual components, such as a display (e.g., one or more liquid-crystal display (LCD)), one or more plasma display panel (PDP), one or more light emitting diode (LED) display, one or more projector, or one or more waveguide. The image displays 904 of the optical assembly are driven by the image display driver 908. The output components of the head-wearable apparatus 902 may further include acoustic components (e.g., speakers), haptic components (e.g., a vibratory motor), other signal generators, and so forth. The input components of the head-wearable apparatus 902, the user device 938, and server system 932, such as the user input device 906, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 902 may optionally include additional peripheral device elements. Such peripheral device elements may include biometric sensors, additional sensors, or display elements integrated with the head-wearable apparatus 902. For example, peripheral device elements may include any input/output (I/O) components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 936 from the user device 938 via the low power wireless circuitry 930 or high-speed wireless circuitry 924.

Any biometric data collected by biometric components is captured and stored only after explicit user approval and deleted on user request. Further, such biometric data is used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Figure 10:
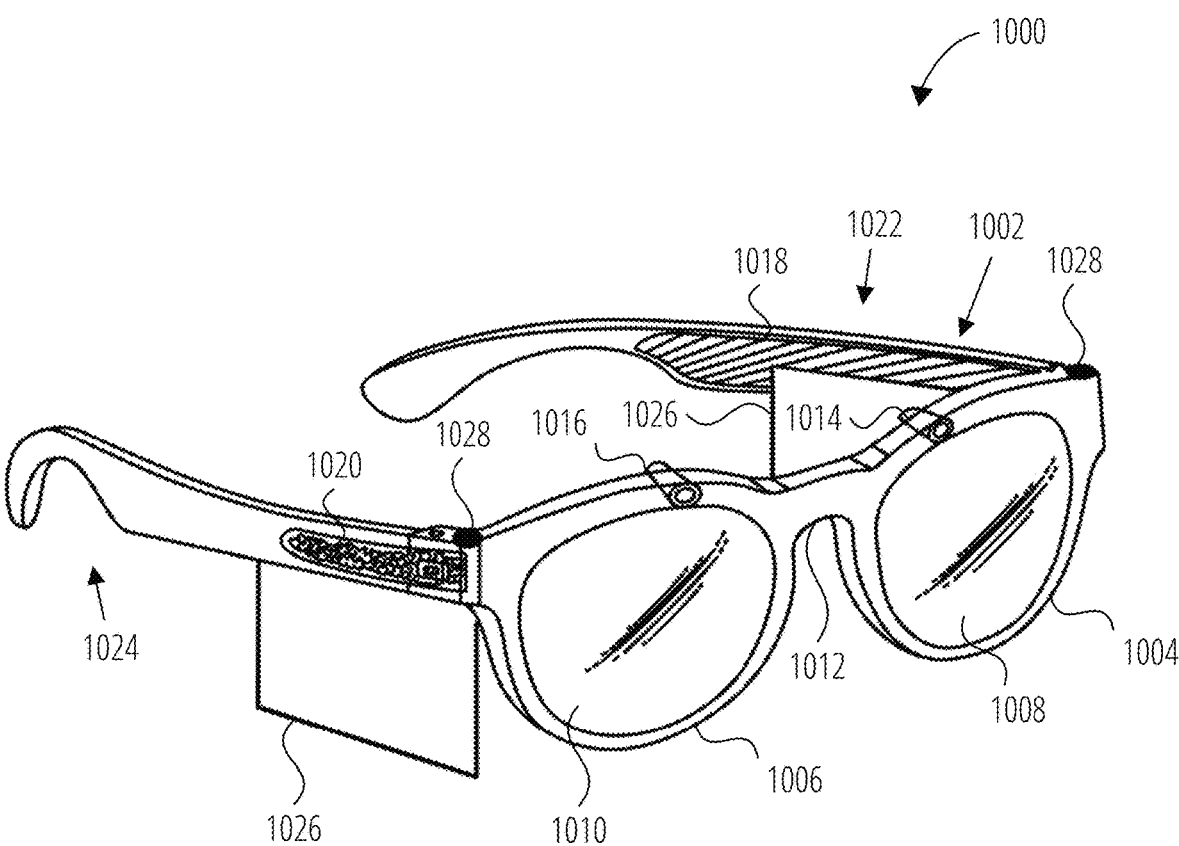
FIG. 10 is a perspective view of a head-worn device, in accordance with some examples.

FIG. 10 is a perspective view of a head-worn XR device in the form of glasses 1000, according to some examples. The glasses 1000 can include a frame 1002 made from any suitable material such as plastic or metal, including any suitable shape memory alloy. In one or more examples, the frame 1002 includes a first or left optical element holder 1004 (e.g., a display or lens holder) and a second or right optical element holder 1006 connected by a bridge 1012. A first or left optical element 1008 and a second or right optical element 1010 can be provided within respective left optical element holder 1004 and right optical element holder 1006. The right optical element 1010 and the left optical element 1008 can be a lens, a display, a display assembly, or a combination of the foregoing. Any suitable display assembly can be provided in the glasses 1000.

The frame 1002 additionally includes a left arm or temple piece 1022 and a right arm or temple piece 1024. In some examples the frame 1002 can be formed from a single piece of material so as to have a unitary or integral construction.

The glasses 1000 can include a computing device, such as a computer 1020, which can be of any suitable type so as to be carried by the frame 1002 and, in one or more examples, of a suitable size and shape, so as to be partially disposed in one of the temple piece 1022 or the temple piece 1024. The computer 1020 can include one or more processors with memory, wireless communication circuitry, and a power source. The computer 1020 may comprise low-power circuitry, high-speed circuitry, and a display processor. Various other examples may include these elements in different configurations or integrated together in different ways.

The computer 1020 additionally includes a battery 1018 or other suitable portable power supply. In some examples, the battery 1018 is disposed in left temple piece 1022 and is electrically coupled to the computer 1020 disposed in the right temple piece 1024. The glasses 1000 can include a connector or port (not shown) suitable for charging the battery 1018, a wireless receiver, transmitter or transceiver (not shown), or a combination of such devices.

The glasses 1000 include a first or left camera 1014 and a second or right camera 1016. Although two cameras are depicted, other examples contemplate the use of a single or additional (i.e., more than two) cameras. In one or more examples, the glasses 1000 include any number of input sensors or other input/output devices in addition to the left camera 1014 and the right camera 1016. Such sensors or input/output devices can additionally include biometric sensors, location sensors, motion sensors, and so forth.

In some examples, the left camera 1014 and the right camera 1016 provide video frame data for use by the glasses 1000 to extract 3D information (for example) from a real world scene. The glasses 1000 may also include a touchpad 1026 mounted to or integrated with one or both of the left temple piece 1022 and right temple piece 1024. The touchpad 1026 is generally vertically-arranged, approximately parallel to a user's temple in some examples. As used herein, generally vertically aligned means that the touchpad is more vertical than horizontal, although potentially more vertical than that. Additional user input may be provided by one or more buttons 1028, which in the illustrated examples are provided on the outer upper edges of the left optical element holder 1004 and right optical element holder 1006. The one or more touchpads 1026 and buttons 1028 provide a means whereby the glasses 1000 can receive input from a user of the glasses 1000.

Figure 11:
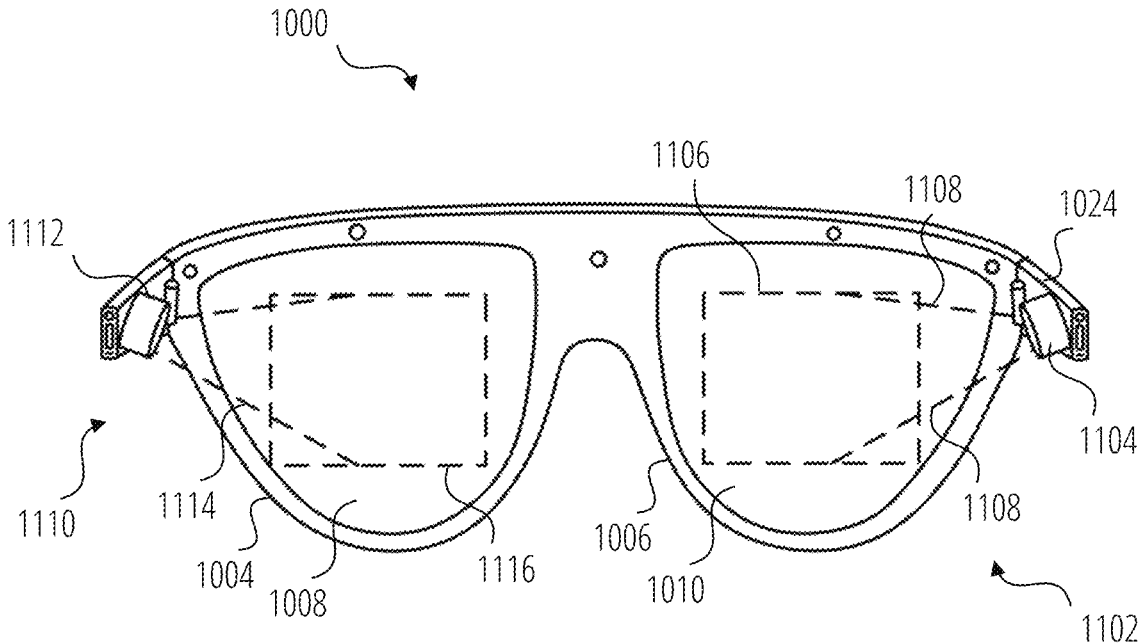
FIG. 11 illustrates a further view of the head-worn device of FIG. 10, in accordance with some examples.

FIG. 11 illustrates the glasses 1000 from the perspective of a user. For clarity, a number of the elements shown in FIG. 10 have been omitted. As described with reference to FIG. 10, the glasses 1000 shown in FIG. 11 include left optical element 1008 and right optical element 1010 secured within the left optical element holder 1004 and the right optical element holder 1006 respectively.

The glasses 1000 include forward optical assembly 1102 comprising a right projector 1104 and a right near eye display 1106, and a forward optical assembly 1110 including a left projector 1112 and a left near eye display 1116.

In some examples, the near eye displays are waveguides. The waveguides include reflective or diffractive structures (e.g., gratings and/or optical elements such as mirrors, lenses, or prisms). Light 1108 emitted by the projector 1104 encounters the diffractive structures of the waveguide of the near eye display 1106, which directs the light towards the right eye of a user to provide an image on or in the right optical element 1010 that overlays the view of the real world seen by the user. Similarly, light 1114 emitted by the projector 1112 encounters the diffractive structures of the waveguide of the near eye display 1116, which directs the light towards the left eye of a user to provide an image on or in the left optical element 1008 that overlays the view of the real world seen by the user.

In some examples, the combination of a graphics processing unit (GPU), the forward optical assembly 1102, the left optical element 1008, and the right optical element 1010 provide an optical engine of the glasses 1000. The glasses 1000 use the optical engine to generate an overlay of the real world view of the user including display of a 3D user interface to the user of the glasses 1000.

It will be appreciated however that other display technologies or configurations may be utilized within an optical engine to display an image to a user in the user's field of view. For example, instead of a projector 1104 and a waveguide, an LCD, LED or other display panel or surface may be provided.

In use, a user of the glasses 1000 will be presented with information, content, and various 3D user interfaces on the near eye displays. As described in more detail herein, the user can then interact with the glasses 1000 using a touchpad 1026 and/or the buttons 1028, voice inputs or touch inputs on an associated device, and/or hand movements, locations, and positions detected by the glasses 1000.

Figure 12:
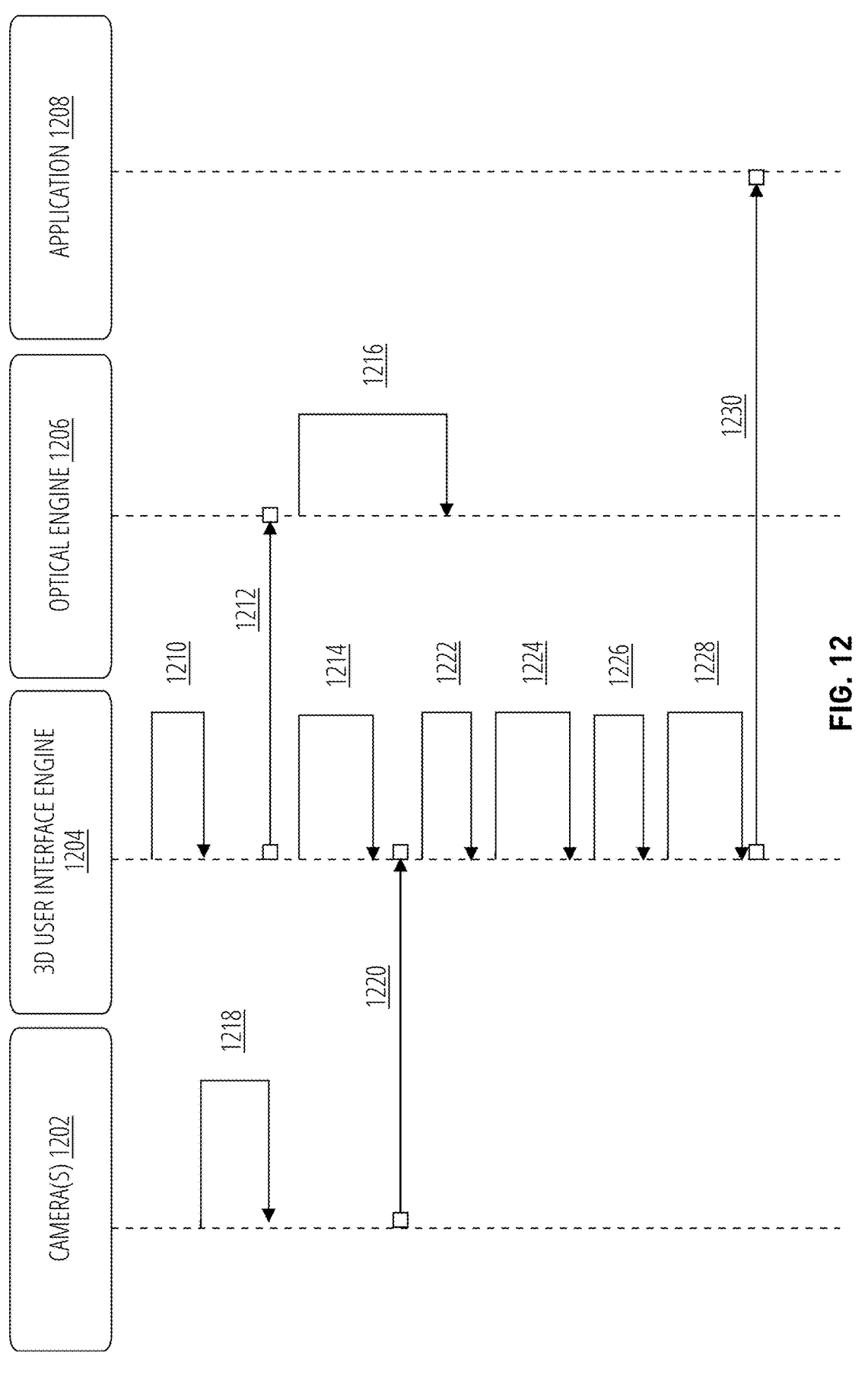
FIG. 12 illustrates a three-dimensional (3D) user interface generation and utilization process in accordance with some examples.
Figure 13:
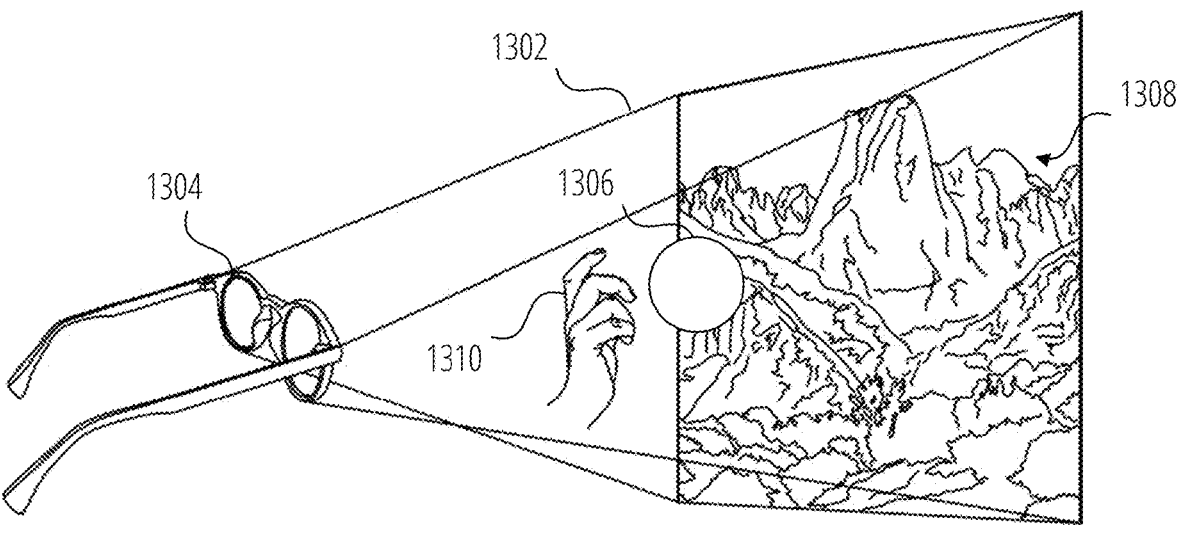
FIG. 13 illustrates a 3D user interface in accordance with some examples.

Referring now to FIG. 12 and FIG. 13, FIG. 12 depicts a sequence diagram of an example 3D user interface process and FIG. 13 depicts a 3D user interface 1302 of glasses 1304 in accordance with some examples. During the process, a 3D user interface engine 1204 generates 1210 the 3D user interface 1302 including one or more virtual objects 1306 that constitute interactive elements of the 3D user interface 1302.

A virtual object may be described as a solid in a 3D geometry having values in 3-tuples of X (horizontal), Y (vertical), and Z (depth). A 3D render of the 3D user interface 1302 is generated and 3D render data 1212 is communicated to an optical engine 1206 of the glasses 1304 and displayed 1216 to a user of the glasses 1304. The 3D user interface engine 1204 generates 1214 one or more virtual object colliders for the one or more virtual objects. One or more camera(s) 1202 of the glasses 1304 generate

1218 real world video frame data 1220 of the real world 1308 as viewed by the user of the glasses 1304.

Included in the real world video frame data 1220 is hand position video frame data of one or more of the user's hands 1310 from a viewpoint of the user while wearing the glasses 1304 and viewing the projection of the 3D render of the 3D user interface 1302 by the optical engine 1206. Thus the real world video frame data 1220 include hand location video frame data and hand position video frame data of the user's hands 1310 as the user makes movements with their hands.

The 3D user interface engine 1204 or other components of the glasses 1304 utilize the hand location video frame data and hand position video frame data in the real world video frame data 1220 to extract landmarks 1222 of the user's hands 1310 from the real world video frame data 1220 and generates 1224 landmark colliders for one or more landmarks on one or more of the user's hands 1310.

The landmark colliders are used to determine user interactions between the user and the virtual object by detecting collisions 1226 between the landmark colliders and respective visual object colliders of the virtual objects. The collisions are used by the 3D user interface engine 1204 to determine user interactions 1228 by the user with the virtual objects. The 3D user interface engine 1204 communicates user interaction data 1230 of the user interactions to an application 1208 for utilization by the application 1208.

In some examples, the application 1208 performs the functions of the 3D user interface engine 1204 by utilizing various APIs and system libraries to receive and process the real world video frame data 1220 and instruct the optical engine 1206.

In some examples, a user wears one or more sensor gloves or other sensors on the user's hands that generate sensed hand position data and sensed hand location data that is used to generate the landmark colliders. The sensed hand position data and sensed hand location data are communicated to the 3D user interface engine 1204 and used by the 3D user interface engine 1204 in lieu of or in combination with the hand location video frame data and hand position video frame data to generate landmark colliders for one or more landmarks on one or more of the user's hands 1310.

Figure 14:
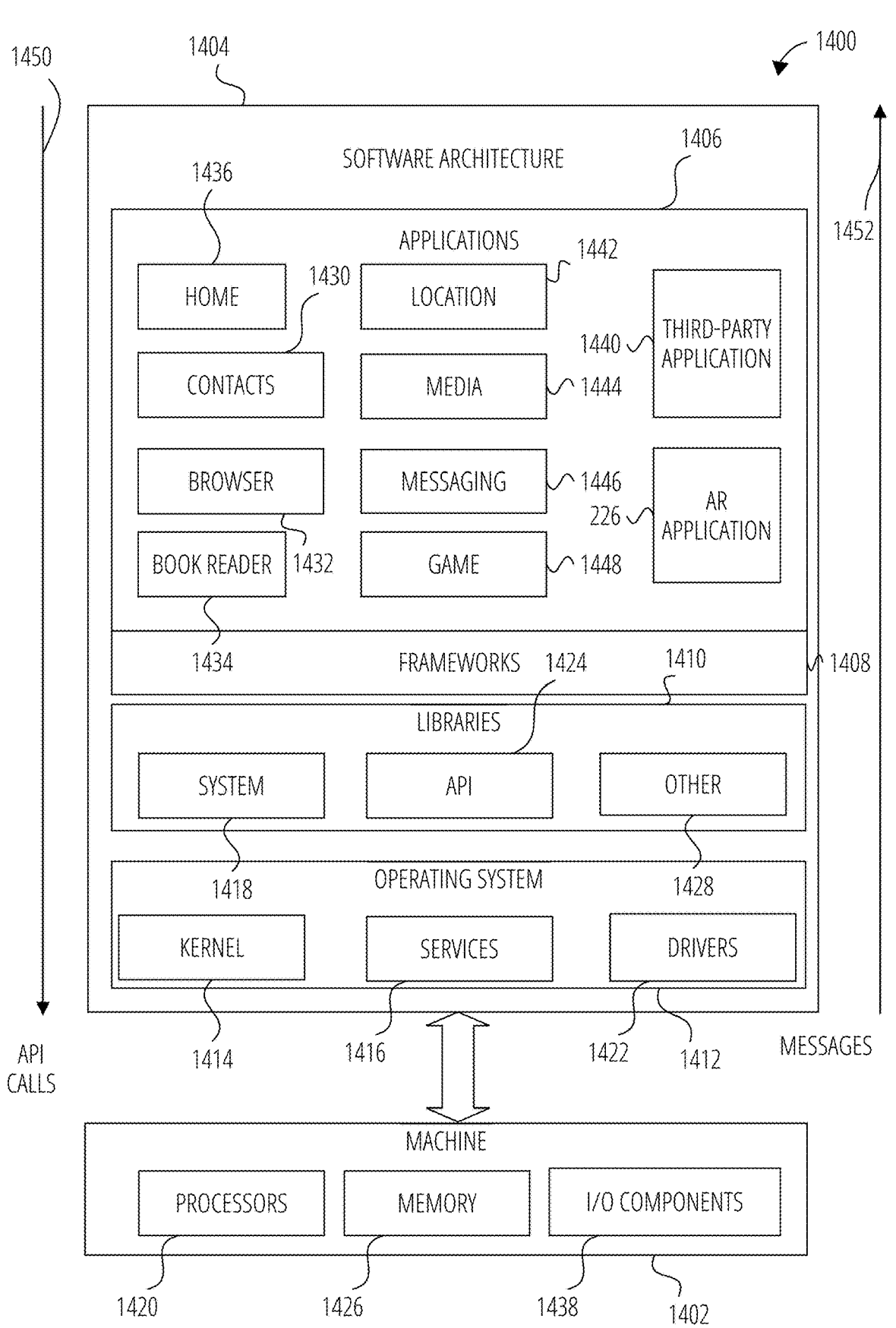
FIG. 14 is a block diagram showing a software architecture within which the present disclosure may be implemented, according to some examples.

FIG. 14 is a block diagram 1400 illustrating a software architecture 1404, which can be installed on one or more of the devices described herein. The software architecture 1404 is supported by hardware such as a machine 1402 that includes processors 1420, memory 1426, and I/O components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450, through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, processor management (e.g., scheduling), component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1410 provide a low-level common infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a high-level common infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In some examples, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In some examples, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 14, the third-party application 1440 can invoke the API calls 1450 provided by the operating system 1412 to facilitate functionality described herein. The applications 1406 may include an AR application such as the AR application 226 described herein, according to some examples.

Figure 15:
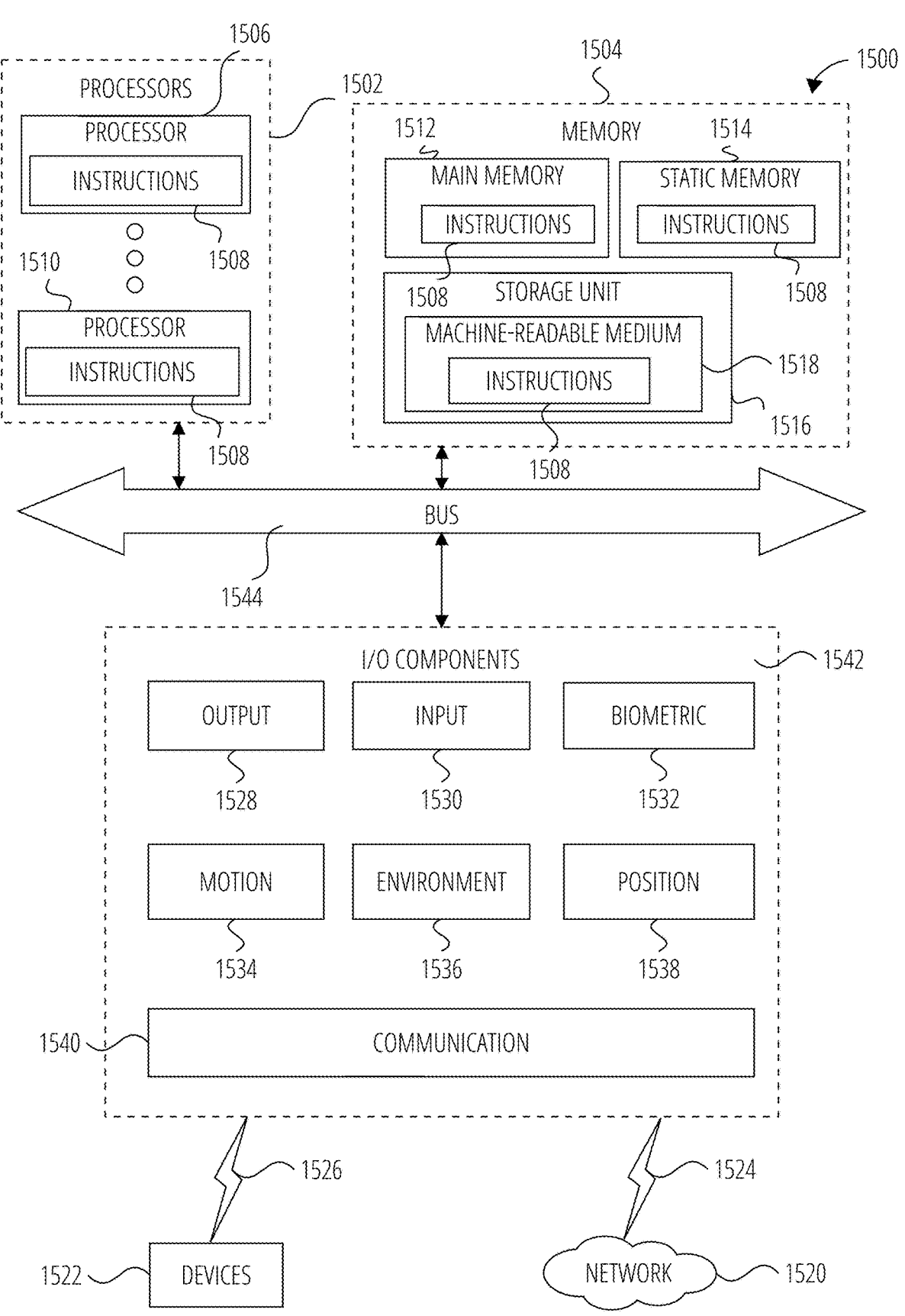
FIG. 15 is a diagrammatic representation of a machine in the form of a computer system within which a set of instructions may be executed for causing the machine to perform any one or more of the methodologies discussed herein, according to some examples.

FIG. 15 is a diagrammatic representation of a machine 1500 within which instructions 1508 (e.g., software, a program, an application, an applet, or other executable code) for causing the machine 1500 to perform one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include processors 1502, memory 1504, and I/O components 1542, which may be configured to communicate with each other via a bus 1544. In some examples, the processors 1502 may include, for example, a processor 1506 and a processor 1510 that execute the instructions 1508. Although FIG. 15 shows multiple processors 1502, the machine 1500 may include a single processor with a single core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, accessible to the processors via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the processors, or any suitable combination thereof, during execution thereof by the machine 1500.

The I/O components 1542 may include a wide variety of components to receive input, provide output, produce output, transmit information, exchange information, capture measurements, and so on. The specific I/O components 1542 that are included in a particular machine will depend on the type of machine. For example, portable machines such as mobile phones may include a touch input device or other such input mechanisms, while a headless server machine will likely not include such a touch input device. It will be appreciated that the I/O components 1542 may include many other components that are not shown in FIG. 15. In various examples, the I/O components 1542 may include output components 1528 and input components 1530.

The output components 1528 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1542 may include biometric components 1532, motion components 1534, environmental components 1536, or position components 1538, among a wide array of other components. For example, the biometric components 1532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 include acceleration sensor components (e.g., accelerometer), gravitation sensor components, rotation sensor components (e.g., gyroscope), and so forth. The environmental components 1536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 include location sensor components (e.g., a GPS receiver components), altitude sensor components (e.g., altimeters or barometers that detect air pressure from which altitude may be derived), orientation sensor components (e.g., magnetometers), and the like.

As mentioned, any biometric data collected by biometric components is captured and stored only after explicit user approval and deleted on user request. Further, such biometric data is used for very limited purposes, such as identification verification. To ensure limited and authorized use of biometric information and other PII, access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1542 further include communication components 1540 operable to couple the machine 1500 to a network 1520 or devices 1522 via a coupling 1524 and a coupling 1526, respectively. For example, the communication components 1540 may include a network interface component or another suitable device to interface with the network 1520. In further examples, the communication components 1540 may include wired communication components, wireless communication components, cellular communication components, Near Field Communication (NFC) components, Bluetooth™ components, Wi-Fi™ components, and other communication components to provide communication via other modalities. The devices 1522 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Data-glyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi™ signal triangulation, location via detecting an NFC beacon signal that may indicate a particular location, and so forth.

The various memories (e.g., memory 1504, main memory 1512, static memory 1514, and/or memory of the processors 1502) and/or storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed examples.

The instructions 1508 may be transmitted or received over the network 1520, using a transmission medium, via a network interface device (e.g., a network interface component included in the communication components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

CONCLUSION

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a GPU, a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is an XR device comprising: one or more optical sensors; one or more processors; and at least one memory storing instructions that, when executed by the one or more processors, cause the XR device, when worn by a user, to perform operations comprising: capturing, via the one or more optical sensors, at least one image of a hand; processing the at least one image to detect the hand; after detecting the hand, determining positioning of the hand relative to at least one of the XR device or another object in a field of view of the XR device; detecting, based on the positioning of the hand relative to at least one of the XR device or the other object, that the hand is a non-user hand; and in response to detecting that the hand is the non-user hand, excluding the hand from egocentric hand tracking performed by the XR device with respect to the user.

In Example 2, the subject matter of Example 1 includes, wherein the hand is detected to be the non-user hand based on both the positioning of the hand relative to the XR device and the positioning of the hand relative to the other object in the field of view of the XR device.

In Example 3, the subject matter of any of Examples 1-2 includes, wherein the determining of the positioning of the hand relative to at least one of the XR device or the other object comprises: generating a 3D position associated with the hand; and determining, based on the 3D position associated with the hand, a distance between the hand and at least one of the user or the XR device, wherein the hand is detected to be the non-user hand based on the distance meeting or exceeding a threshold.

In Example 4, the subject matter of any of Examples 1-3 includes, wherein the determining of the positioning of the hand relative to at least one of the XR device or the other object comprises: generating a zone associated with a location of the hand within the at least one image, wherein the hand is detected to be the non-user hand based on a size of the zone satisfying a predetermined condition.

In Example 5, the subject matter of Example 4 includes, wherein the generating of the zone comprises generating a bounding element that covers at least part of the hand, and the size of the zone comprises a 2D area of the bounding element.

In Example 6, the subject matter of any of Examples 1-5 includes, wherein the other object is a user hand that is being tracked using the egocentric hand tracking performed by the XR device, and the determining of the positioning of the hand relative to at least one of the XR device or the other object comprises: comparing the positioning of the hand with positioning of the user hand, wherein the hand is detected to be the non-user hand based on the positioning of the hand relative to the user hand being invalid according to a predetermined condition.

In Example 7, the subject matter of Example 6 includes, wherein the predetermined condition indicates, based on a chirality of the user hand, on which side of the user hand the hand is to appear in the at least one image.

In Example 8, the subject matter of any of Examples 1-7 includes, the operations further comprising: identifying a chirality of the hand, wherein the hand is detected to be the non-user hand based on both the chirality of the hand and horizontal positioning of the hand within a scene captured by the at least one image.

In Example 9, the subject matter of Example 8 includes, wherein the horizontal positioning of the hand is provided as input to a decision function to generate a value indicative of a likelihood that the positioning of the hand is invalid.

In Example 10, the subject matter of any of Examples 8-9 includes, wherein the other object is a user hand with a known chirality that is being tracked using the egocentric hand tracking performed by the XR device, and the known chirality of the user hand that is being tracked is used to estimate the chirality of the non-user hand.

In Example 11, the subject matter of any of Examples 1-10 includes, wherein the determining of the positioning of the hand relative to at least one of the XR device or the other object comprises: determining an entry region of the hand within the field of view of the XR device, wherein the hand is detected to be the non-user hand based on the entry region being invalid according to a predetermined condition.

In Example 12, the subject matter of any of Examples 1-11 includes, wherein the other object comprises an arm that appears in the at least one image, and the determining of the positioning of the hand relative to at least one of the XR device or the other object comprises: detecting that the arm corresponds to the hand, wherein the hand is detected to be the non-user hand based on positioning of the arm relative to at least one of the hand or the XR device.

In Example 13, the subject matter of any of Examples 1-12 includes, the operations further comprising: causing presentation, to the user, of a gesture-driven user interface comprising virtual content; and performing the egocentric hand tracking to obtain, from the user, user input for navigation of the gesture-driven user interface.

In Example 14, the subject matter of any of Examples 1-13 includes, wherein, for a given hand detected by the XR device during a detection phase, the egocentric hand tracking is performed in a tracking phase that follows completion of the detection phase.

In Example 15, the subject matter of Example 14 includes, wherein the excluding of the hand from the egocentric hand tracking is performed after completion of the detection phase for the hand, but prior to commencement of the tracking phase for the hand.

In Example 16, the subject matter of any of Examples 14-15 includes, wherein the excluding of the hand from the egocentric hand tracking is performed after completion of the detection phase and after commencement of the tracking phase for the hand.

In Example 17, the subject matter of Example 14 includes, wherein the detecting, based on the positioning of the hand relative to at least one of the XR device or the other object, that the hand is a non-user hand, comprises executing a plurality of rejection filters in a predetermined sequence that comprises at least one rejection filter that is executed before commencement of the tracking phase and at least one further rejection filter that is executed during the tracking phase.

In Example 18, the subject matter of any of Examples 1-17 includes, wherein the processing of the at least one image to detect the hand comprises executing an object detection machine learning model that returns a confidence value, the operations further comprising: determining that the confidence value meets or exceeds a threshold; and in response to determining that the confidence value meets or exceeds the threshold, triggering the determining of the positioning of the hand relative to at least one of the XR device or the other object to cause identification of the hand as either a user hand or the non-user hand.

In Example 19, the subject matter of any of Examples 1-18 includes, wherein the XR device is a head-wearable XR device, and the operations are performed while the XR device is worn on a head of the user.

In Example 20, the subject matter of any of Examples 1-19 includes, wherein the detecting, based on the positioning of the hand relative to at least one of the XR device or the other object, that the hand is a non-user hand, comprises executing a plurality of rejection filters in a predetermined sequence.

Example 21 is a method performed by an XR device while the XR device is worn by a user, the method comprising: capturing, via one or more optical sensors, at least one image of a hand; processing the at least one image to detect the hand; after detecting the hand, determining positioning of the hand relative to at least one of the XR device or another object in a field of view of the XR device; detecting, based on the positioning of the hand relative to at least one of the XR device or the other object, that the hand is a non-user hand; and in response to detecting that the hand is the non-user hand, excluding the hand from egocentric hand tracking performed by the XR device with respect to the user.

Example 22 is one or more non-transitory computer-readable storage media, the one or more non-transitory computer-readable storage media including instructions that, when executed by at least one processor of an XR device worn by a user, cause the XR device to perform operations comprising: capturing, via one or more optical sensors, at least one image of a hand; processing the at least one image to detect the hand; after detecting the hand, determining positioning of the hand relative to at least one of the XR device or another object in a field of view of the XR device; detecting, based on the positioning of the hand relative to at least one of the XR device or the other object, that the hand is a non-user hand; and in response to detecting that the hand is the non-user hand, excluding the hand from egocentric hand tracking performed by the XR device with respect to the user.

Example 23 is at least one machine-readable medium including instructions that, when executed by processing circuitry, cause the processing circuitry to perform operations to implement any of Examples 1-22.

Example 24 is an apparatus comprising means to implement any of Examples 1-22.

Example 25 is a system to implement any of Examples 1-22.

Example 26 is a method to implement any of Examples 1-22.

What is claimed is:

1. An extended reality (XR) device comprising:
one or more optical sensors;
one or more processors; and
at least one memory storing instructions that, when executed by the one or more processors, cause the XR device, when worn by a user, to perform operations comprising:
capturing, via the one or more optical sensors, at least one image of a hand;
processing the at least one image to detect the hand, the processing comprising executing at least one object detection machine learning model that returns a confidence value;
after detecting the hand, determining positioning of the hand relative to at least one of the XR device or an additional object in a field of view of the XR device, the determining of the positioning of the hand relative to at least one of the XR device or the additional object being triggered based on determining that the confidence value meets or exceeds a threshold;
detecting, based on the positioning of the hand relative to at least one of the XR device or the additional object, that the hand is a non-user hand; and
in response to detecting that the hand is the non-user hand, excluding the hand from egocentric hand tracking performed by the XR device with respect to the user.

2. The XR device of claim 1, wherein the hand is detected to be the non-user hand based on both the positioning of the hand relative to the XR device and the positioning of the hand relative to the additional object in the field of view of the XR device.

3. The XR device of claim 1, wherein the detecting, based on the positioning of the hand relative to at least one of the XR device or the additional object, that the hand is the non-user hand, comprises executing a plurality of rejection filters in a predetermined sequence.

4. The XR device of claim 1, wherein the determining of the positioning of the hand relative to at least one of the XR device or the additional object comprises:

generating a three-dimensional (3D) position associated with the hand; and determining, based on the 3D position associated with the hand, a distance between the hand and at least one of the user or the XR device, wherein the hand is detected to be the non-user hand based on the distance meeting or exceeding a threshold.

5. The XR device of claim 1, wherein the determining of the positioning of the hand relative to at least one of the XR device or the additional object comprises:

generating a zone associated with a location of the hand within the at least one image, wherein the hand is detected to be the non-user hand based on a size of the zone satisfying a predetermined condition.

6. The XR device of claim 5, wherein the generating of the zone comprises generating a bounding element that covers at least part of the hand, and the size of the zone comprises a two-dimensional (2D) area of the bounding element.

7. The XR device of claim 1, wherein the additional object is a user hand that is being tracked using the egocentric hand tracking performed by the XR device, and the determining of the positioning of the hand relative to at least one of the XR device or the additional object comprises:

comparing the positioning of the hand with positioning of the user hand, wherein the hand is detected to be the non-user hand based on the positioning of the hand relative to the user hand being invalid according to a predetermined condition.

8. The XR device of claim 7, wherein the predetermined condition indicates, based on a chirality of the user hand, on which side of the user hand the hand is to appear in the at least one image.

9. The XR device of claim 1, the operations further comprising:

identifying a chirality of the hand, wherein the hand is detected to be the non-user hand based on both the chirality of the hand and horizontal positioning of the hand within a scene captured by the at least one image.

10. The XR device of claim 9, wherein the horizontal positioning of the hand is provided as input to a decision function to generate a value indicative of a likelihood that the positioning of the hand is invalid.

11. The XR device of claim 1, wherein the determining of the positioning of the hand relative to at least one of the XR device or the additional object comprises:

determining an entry region of the hand within the field of view of the XR device, wherein the hand is detected to be the non-user hand based on the entry region being invalid according to a predetermined condition.

12. The XR device of claim 1, wherein the additional object comprises an arm that appears in the at least one image, and the determining of the positioning of the hand relative to at least one of the XR device or the additional object comprises:

detecting that the arm corresponds to the hand, wherein the hand is detected to be the non-user hand based on positioning of the arm relative to at least one of the hand or the XR device.

13. The XR device of claim 1, the operations further comprising:

causing presentation, to the user, of a gesture-driven user interface comprising virtual content; and performing the egocentric hand tracking to obtain, from the user, user input for navigation of the gesture-driven user interface.

14. The XR device of claim 1, wherein, for a given hand detected by the XR device during a detection phase, the egocentric hand tracking is performed in a tracking phase that follows completion of the detection phase.

15. The XR device of claim 14, wherein the excluding of the hand from the egocentric hand tracking is performed after completion of the detection phase for the hand.

16. The XR device of claim 14, wherein the detecting, based on the positioning of the hand relative to at least one of the XR device or the additional object, that the hand is a non-user hand, comprises executing a plurality of rejection filters in a predetermined sequence that comprises at least one rejection filter that is executed before commencement of the tracking phase and at least one further rejection filter that is executed during the tracking phase.

17. The XR device of claim 1, wherein the XR device is a head-wearable XR device, and the operations are performed while the XR device is worn on a head of the user.

18. A method performed by an extended reality (XR) device while the XR device is worn by a user, the method comprising:

capturing, via one or more optical sensors, at least one image of a hand;

processing the at least one image to detect the hand, the processing comprising executing at least one object detection machine learning model that returns a confidence value;

after detecting the hand, determining positioning of the hand relative to at least one of the XR device or an additional object in a field of view of the XR device, the determining of the positioning of the hand relative to at least one of the XR device or the additional object being triggered based on determining that the confidence value meets or exceeds a threshold;

detecting, based on the positioning of the hand relative to at least one of the XR device or the additional object, that the hand is a non-user hand; and in response to detecting that the hand is the non-user hand, excluding the hand from egocentric hand tracking performed by the XR device with respect to the user.

19. The method of claim 18, wherein the hand is detected to be the non-user hand based on both the positioning of the hand relative to the XR device and the positioning of the hand relative to the additional object in the field of view of the XR device.

20. One or more non-transitory computer-readable storage media, the one or more non-transitory computer-readable storage media including instructions that, when executed by at least one processor of an extended reality (XR) device worn by a user, cause the XR device to perform operations comprising:

capturing, via one or more optical sensors, at least one image of a hand;

processing the at least one image to detect the hand, the processing comprising executing at least one object detection machine learning model that returns a confidence value;

after detecting the hand, determining positioning of the hand relative to at least one of the XR device or an additional object in a field of view of the XR device, the determining of the positioning of the hand relative to at least one of the XR device or the additional object being triggered based on determining that the confidence value meets or exceeds a threshold;

detecting, based on the positioning of the hand relative to at least one of the XR device or the additional object, that the hand is a non-user hand; and in response to detecting that the hand is the non-user hand, excluding the hand from egocentric hand tracking performed by the XR device with respect to the user.

\* \* \* \* \*